United States Patent [19]
Kurokawa et al.

[11] Patent Number: 5,706,465
[45] Date of Patent: Jan. 6, 1998

[54] COMPUTERS HAVING CACHE MEMORY

[75] Inventors: Hiroshi Kurokawa, Hadano; Kazunori Kuriyama, Iruma-gun; Naohiko Irie, Kokubunji, all of Japan

[73] Assignee: Hitachi, Ltd., Tokyo, Japan

[21] Appl. No.: 215,109

[22] Filed: Mar. 21, 1994

[30] Foreign Application Priority Data

Mar. 19, 1993 [JP] Japan .................................. 5-060036

[51] Int. Cl.⁶ .................................................. G06F 13/00
[52] U.S. Cl. ...................... 395/450; 395/500; 395/460; 395/465; 395/411
[58] Field of Search .................................. 395/375, 450, 395/500, 460–465, 411; 364/748

[56] References Cited

U.S. PATENT DOCUMENTS

| | | | |
|---|---|---|---|
| 4,408,275 | 10/1983 | Kubo et al. | 395/405 |
| 4,961,162 | 10/1990 | Nguyenphu et al. | 364/748 |
| 5,202,972 | 4/1993 | Gusefski et al. | 395/450 |
| 5,291,586 | 3/1994 | Jen et al. | 395/500 |
| 5,379,393 | 1/1995 | Yang | 395/403 |
| 5,381,531 | 1/1995 | Hanawa et al. | 395/375 |

*Primary Examiner*—Robert B. Harrell
*Assistant Examiner*—Saleh Najjar
*Attorney, Agent, or Firm*—Antonelli, Terry, Stout, & Kraus, LLP

[57] ABSTRACT

An auxiliary data processor having an built-in multi-entry data memory is directly connected to a main storage, and executes, directly accessing the main storage, commands sent from a plurality of instruction processors. One data memory entry is assigned to an instruction processor that issued a command, and reserves data fetched from the main storage in response to the command so that the next command can use part of that data. A tag circuit holds an identifier of each instruction processor to which a data memory entry has been assigned and the address and length of data hold in that entry, and see that each command uses the reserved data correctly. Each instruction processor selects commands to be sent to the auxiliary data processor depending upon the conditions of operands. A large amount of data is processed at a high rate, minimizing cache pollution.

13 Claims, 16 Drawing Sheets

| # | OVERLAP | LENGTH | op1 UPDATE | op1 | op2(0) | op2(1) | COMMAND DESTINATION |
|---|---------|--------|------------|-----|--------|--------|---------------------|
| 1 | YES | - | - | - | - | - | GACC (230) |
| 2 | NO | <PREDETERMINED VALUE | - | - | - | - | |
| 3 | NO | ≥PREDETERMINED VALUE | YES | HIT | - | - | |
| 4 | NO | ≥PREDETERMINED VALUE | YES | - | HIT | - | |
| 5 | NO | ≥PREDETERMINED VALUE | YES | MISS | MISS | HIT | |
| 6 | NO | ≥PREDETERMINED VALUE | NO | - | - | MISS | ADP (1) |
| 7 | NO | ≥PREDETERMINED VALUE | NO | - | - | - | |

FIG. 4

| STAGE \ ODR | MOVE PROCESSING | ARITHMETIC AND LOGIC PROCESSING | COMPARE PROCESSING |
|---|---|---|---|
| R1 | • ALWAYS BYPASS. (1ST OPERAND NEED NOT BE FETCHED.) | • FETCH 1ST OPERAND FROM MEMORY. | • (SAME AS LEFT.) |
| R20 | • FETCH 1ST HALF OF 2ND OPERAND FROM MEMORY. IF THIS DATA HAS BEEN STORED IN TAG REGISTER, BYPASS. | • (SAME AS LEFT.) | • (SAME AS LEFT.) |
| R21 | • FETCH 2ND HALF OF 2ND OPERAND FROM MEMORY, IF VALID.<br>• CONCATENATE 1ST AND 2ND HALVES OF 2ND OPERAND.<br>• SET 2ND OPERAND (TRANSFER DATA) IN OPERATION RESULT REGISTER. | • (SAME AS LEFT.)<br>• OPERATE ON 1ST AND 2ND OPERANDS AND SET RESULT IN OPERATION RESULT REGISTER. | • (SAME AS LEFT.)<br>• COMPARE 1ST AND 2ND OPERANDS AND SET RESULT IN OPERATION RESULT REGISTER. |
| W | • STORE DATA FETCHED AT STAGE R21 INTO DATA MEMORY AND RELATED INFORMATION INTO TAG REGISTER.<br>• SEND PROCESSING RESPONSE TO INSTRUCTION PROCESSOR.<br>• STORE TRANSFER DATA INTO MEMORY. | • (SAME AS LEFT.)<br>• STORE OPERATION RESULT INTO MEMORY. | • (SAME AS LEFT.) |

| # | REFERENCE REQUEST SOURCE | REFERENCE REQUEST | | WS | REGISTER IN WS | DATA FLOW |
|---|---|---|---|---|---|---|
| 1 | IP (200) | NORMAL FETCH | HIT | | NO | WS→ |
| 2 | | | MISS | | YES | (MS→WS)→ |
| 3 | | NORMAL STORE | HIT | | NO | →WS |
| 4 | | | MISS | | YES | →(MS→WS) |
| 5 | ADP (1) | DIRECT FETCH | HIT | | NO | WS→ |
| 6 | | | MISS | | | MS→ |
| 7 | | DIRECT STORE | HIT | | NO | →WS |
| 8 | | | MISS | | | →MS |

FIG. 19

| # | OVERLAP | LENGTH | op1 UPDATE | op1 | op2(0) | op2(1) | COMMAND DESTINATION |
|---|---------|--------|------------|-----|--------|--------|---------------------|
| 1 | YES | | - | - | - | - | GACC(230) |
| 2 | NO | - | YES | HIT | - | - | AACC(240) |
| 3 | NO | - | YES | MISS | - | - | ADP(1) |
| 4 | | | NO | - | - | - | |

FIG. 20

| # | REFERENCE REQUEST SOURCE | REFERENCE REQUEST | BS | WS | DATA FLOW |
|---|--------------------------|-------------------|-----|-----|-----------|
| 1 | GACC(230) | NORMAL FETCH | HIT | - | BS→ |
| 2 | GACC(230) | NORMAL FETCH | MISS | HIT | (WS→BS)→ |
| 3 | GACC(230) | NORMAL FETCH | MISS | MISS | ((MS→WS)→BS)→ |
| 4 | GACC(230) | NORMAL STORE | HIT | - | →BS |
| 5 | GACC(230) | NORMAL STORE | - | HIT | →WS |
| 6 | GACC(230) | NORMAL STORE | - | MISS | →(MS→WS) |
| 7 | AACC(240) | DIRECT FETCH | HIT | - | BS→ |
| 8 | AACC(240) | DIRECT FETCH | MISS | HIT | WS→ |
| 9 | AACC(240) | DIRECT FETCH | MISS | MISS | MS→ |
| 10 | AACC(240) | DIRECT STORE | HIT | - | →BS |
| 11 | AACC(240) | DIRECT STORE | - | HIT | →WS |
| 12 | AACC(240) | DIRECT STORE | - | MISS | →MS |

COMPUTERS HAVING CACHE MEMORY

BACKGROUND OF THE INVENTION

The present invention relates to a computer or computer system having a cache memory or buffer storage, and particularly relates to improvements in processing of a large amount of data stored in a memory at a high rate without polluting the cache memory.

In a conventional computer, moving of data from a location to another location in a memory consists of a sequence of instruction processor operations, namely: fetching data from the memory, sending it to an arithmetic and logic unit (ALU), and then storing the data into the memory. The rate or throughput (bytes per second) of such a move processing is determined by the product of a data processing width in each move operation (bytes per operation) by a data processing pitch (operations per second). The throughput of the move processing can thus be increased by increasing at least one of the data processing width and the data processing pitch.

For example, Japan Patent Provisional Publication H2-214937 (a counterpart of U.S. application Ser. No. 07/292,304/1988 which was abandoned, hereinafter called reference 1) discloses a cache memory system having a data path for fetching data from a cache memory and storing it directly into the cache memory via an ALU attached to the cache memory, not via an ALU in the instruction processor, for the purpose of faster execution of a memory-memory instruction. This system is capable of executing an instruction which designates every operand within memory at a high rate, taking advantage of the fact that data need not be sent to the ALU in the instruction processor and that the data width of the cache memory is greater than the data width of the ALU in the instruction processor. Reference 1 also discloses a mechanism that aligns data according to the fetch data address, store data address, and fetch/store boundary of the cache memory, and further a mechanism that reserves part of the fetched data in a register and concatenates it with part of the next fetched data into data to be processed which is as wide as the data width of the cache memory. Although the disclosure does not include any description of processing performed on occurrence of a cache miss, it can be assumed that both data fetching from a main storage and data storing into the cache memory are carried out according to the conventional cache memory function.

Japan Patent Provisional Publication H3-37744 (a counterpart of U.S. application Ser. No. 371,343/1989, now U.S. Pat. No. 4,981,417 hereinafter called reference 2) discloses a mechanism for executing a block transfer instruction, which transfers data via a data transfer path between a cache memory and a main storage, not via a CPU, in the burst mode having a higher data transfer rate than the normal mode. Data at a source address is transferred from the cache memory on occurrence of a cache hit, or from the main storage through a system bus on occurrence of a cache miss, to a cache output buffer, and subsequently therefrom to a destination address in the main storage through the system bus. The normal mode and the burst mode have different transfer protocols, and the data transfer rate in the burst mode is considerably higher than that in the normal mode. Consequently, a large amount of data can be transferred at a high rate in the burst mode. Although the disclosure does not include any description as to whether or not data fetched from the main storage is stored into the cache memory when a cache miss occurs for a source address, it is explained that the input of the cache memory is invalidated when a cache hit occurs for a destination address. It is understood that, when a cache miss occurs for a destination address, main storage data at the destination address is never stored into the cache memory.

Japan Patent Provisional Publication H3-3047 (hereinafter called reference 3) discloses a memory having an ALU directly attached thereto. This ALU includes registers which retain an operand and the result of an operation, and carries out various operations including arithmetic operations on data identified by addresses in the memory according to control signals sent from the outside, without transferring data to the outside. However, the disclosure does not contain any explanation of an instruction processor that controls this ALU-equipped memory. Therefore, it is not known whether the instruction processor has a cache memory and whether data stored in the memory are all processed inside the ALU-equipped memory. Furthermore, the purpose of this ALU-equipped memory is a substitution for each processor in a multi-processor system, and it is not contemplated at all that this ALU-equipped memory is shared by several instruction processors.

The aforementioned prior art poses up the following problems:

PROBLEM 1: Pollution of a cache memory

When data fetched from a main storage is stored into a cache memory, old data having been stored therein is thrown out. If an instruction requires the data that has been thrown out, the data must be fetched again from the main storage and stored in the cache memory. The merit of using the cache memory will disappear unless the probability at which data required by an instruction exists in the cache memory, or a hit rate, is high enough. If a large amount of data exceeding the capacity of the cache memory is processed at one time, the cache memory will be occupied by data which will be rarely used in the near future. This phenomenon is called a cache pollution. If a cache pollution occurs, the hit rate of the cache memory drastically reduces, and consequentially the performance of the computer reduces strikingly.

The ALU-equipped memory disclosed in reference 1 cannot be free from cache pollution which is caused by processing of a large amount of data. The mechanism for transferring data in the burst mode which is disclosed in reference 2 will not cause a cache pollution problem if it is assumed that data store into the cache memory is omitted when a cache miss occurs in the course of burst mode transfer. However, this mechanism is only for data transfer and is incapable of performing any other processing. If the ALU-equipped memory disclosed in reference 3 is used for every processing involving a memory reference, the cache pollution will never occur. However, this means that the cache memory is completely out of use, and therefore the provision of the cache memory does not make sense. Furthermore, the ALU-equipped memory does not have a function to process data that extends across a fetch/store boundary. Accordingly, restrictions are imposed on the position of data that can be processed.

PROBLEM 2: Selective use of a cache memory and an ALU-equipped memory

If an ALU-equipped memory disclosed in reference 3 executes all instructions that specify data in a main storage as operands, the cache pollution is prevented, but the cache memory becomes useless. The overall processing performance will be reduced unless either the instruction execution using the cache memory by an instruction processor itself or the instruction execution without using the cache memory by the ALU-equipped memory is restored to selectively.

PROBLEM 3: Misuse of data in a multiple instruction processor system

It is recommendable that an ALU-equipped memory is shared by two or more instruction processors. However, when processing requests from several instruction processors are executed concurrently, data retained in a register for the execution of a processing request from a certain instruction processor may possibly be misused for the execution of a processing request from another instruction processor. This problem can be avoided by withholding the execution of processing requests from other instruction processors until the execution of a sequence of processing requests from one instruction processor is completed. However, this will reduce the overall processing speed of the system.

PROBLEM 4: Data incoherency in a multiple instruction processor system

Assuming that data from a certain address is temporarily held in a register in the ALU-equipped memory for the execution of a processing request from a certain instruction processor, during which another instruction processor stores different data into the same address in the main storage, then processing using that data which is temporarily held in the register will result in an error. In the multiple instruction processor system, it is very important to prevent such errors.

SUMMARY OF THE INVENTION

It is, therefore, an object of the present invention to solve the above-mentioned problems. More particularly:

One object of the present invention is to process a large amount of data at a high rate with a minimum cache pollution.

Another object of this invention is to optimize the selective use of a cache memory and an ALU-equipped memory.

Another object of this invention is to prevent misuse of data in a multiple instruction processor system in which a single ALU-equipped memory is shared by a plurality of instruction processors.

Still another object of this invention is to prevent data incoherency in a multiple instruction processor system in which a single ALU-equipped memory is shared by a plurality of instruction processors.

In accordance with this invention, a plurality of arithmetic and logic units (ALUs) are selectively utilized depending upon the condition of operands that are identified by memory addresses. These ALUs differently cooperate with a hierarchical memory system including a cache memory.

In an embodiment, a first ALU is connected to a cache memory in a conventional manner, and a second ALU is connected directly to a main storage. The data width of the second ALU may be larger than that of the first ALU. There is provided a circuit for determining the condition of each operand and a circuit for selectively actuating the first or second ALU depending upon the determined condition of the operands. The condition to be determined may include: how long the operand is, whether there is an operand to be updated, whether the operand is present in the cache memory, or whether the operand to be fetched overlaps the operand to be stored, either singly or in combination.

A third ALU may be added, which is connected to both the cache memory and main storage, and processes data by referring the cache memory when a cache hit occurs, or by referring directly to the main memory when a cache miss occurs. The data width of the third ALU may be also larger than that of the first ALU. Alternatively, the combination of the first and third ALUs alone may be adopted. In any case, these ALUs are selectively utilized depending upon the condition of each operand.

Thus, operands which may possibly cause a cache pollution are processed by the second or third ALU. The second ALU processes data without using the cache memory, and the third ALU prevents new data from being registered into the cache memory, whereby a cache pollution is prevented.

In a configuration wherein a work storage, which is a kind of cache memory, intervenes between the main storage and the instruction processor, it is advantageous also to alter the function of the work storage depending upon the situation. For this purpose, a control circuit responses to a reference request from the second or third ALU, and, when a miss occurs in the work storage, inhibits data fetched from the main storage from being registered into the work storage, thereby guarding the work storage from pollution.

Thus the aforementioned problems 1 and 2 are solved by this invention.

The multiple processor system in accordance with the present invention includes an auxiliary data processor which is connected to a shared memory and to a plurality of instruction processors, and refers directly to the memory in executing processing commands sent from the instruction processors. This auxiliary data processor includes a data retaining circuit and a management circuit for this data retaining circuit. The data retaining circuit retains at least part of data which is fetched from the memory in accordance with a first processing command but is not used by this processing command so that this unused part of data can be used by a succeeding second processing command. The management circuit manages assignment of the data retaining circuit to the first processing command and the use of data in the data retaining circuit by the second processing command.

The management circuit includes a management information retaining circuit and a control circuit. The management information retaining circuit retains identification information of an instruction processor which issued the first processing command as well as the address and length of the unused data retained in the data retaining circuit. The control circuit allows the second processing command to use the unused data retained in the data retaining circuit, if the instruction processor which issued the second processing command is the instruction processor which is identified by the identification information retained in the management information retaining circuit, and also the area identified by the address and length retained in the management information retaining circuit includes an area identified by the address and length specified by the second processing command.

The control circuit further includes a circuit which controls memory coherency of the data retaining circuit in response to a cancel request sent from the memory coherency circuit in the memory.

Thus the management circuit checks coincidence of instruction processor and the address and length of data before allowing a processing command to use data retained in the data retaining circuit. Therefore, data stored in the data retaining circuit by an instruction processor is kept from being erroneously used by another instruction processor. This solves Problem 3.

Moreover, memory coherency control of the data retaining circuit by the management circuit assures that valid data in the data retaining circuit is coherent to that stored in the memory and prevents unupdated data from being used erroneously. This solves Problem 4.

BRIEF DESCRIPTION OF THE DRAWINGS

FIG. 4 is a list of operations in respective processing stages for various kinds of processings.

FIG. 19 is a decision table in the instruction processor shown in FIG. 18.

FIG. 20 is a list of manners of data move processing under various conditions.

DETAILED DESCRIPTION OF THE PREFERRED EMBODIMENTS

Figure 1:
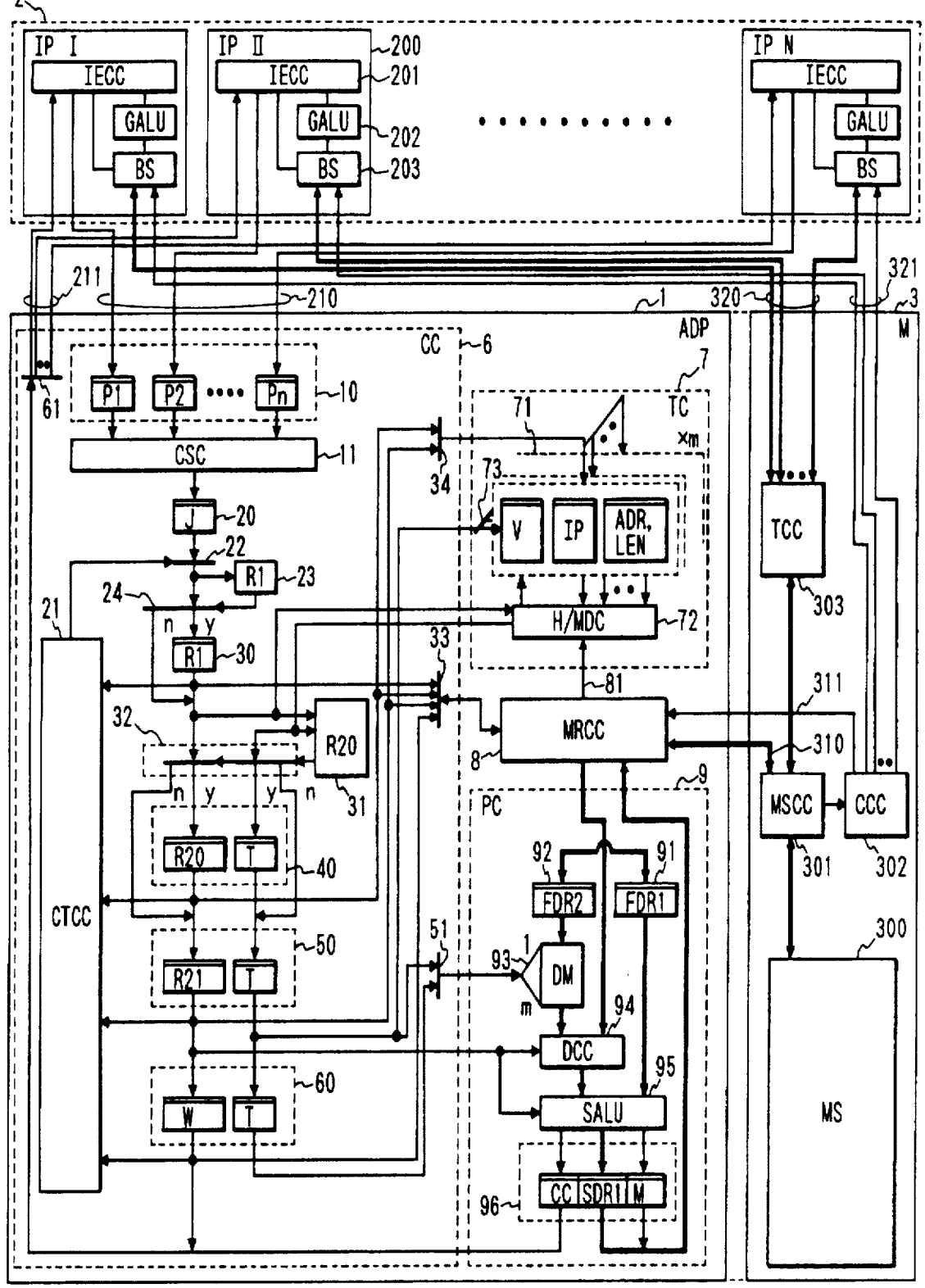
FIG. 1 is a block diagram illustrating a first embodiment of the present invention.

FIG. 1 shows a first embodiment of the present invention. In a multiple processor system in which a group 2 of instruction processors share a memory, an auxiliary data processor (ADP) 1 in accordance with the present invention is directly connected to a memory (M) 3. Each instruction processor (IP) 200 includes an instruction execution control circuit (IECC) 201, a general-purpose ALU (GALU) 202, and a cache memory or buffer storage (BS) 203.

The memory 3 includes a main storage (MS) 300, an MS control circuit (MSCC) 301 which arbitrates among a plurality of memory reference requests, a coherence control circuit (CCC) 302 which carries out memory coherency control, and a transfer control circuit (TCC) 303 which transfers data to and from each instruction processor 200. The auxiliary data processor 1 processes, within itself, data in the MS 300 in response to a processing command sent from each instruction processor 200 without transferring the data to the instruction processor.

In this embodiment, the BS 203 holds a duplicate or copy of MS data, treating 256 bytes as a unit. This 256-byte area is hereinafter called a block. The block is also the reference unit of the MS 300. In other words, data of one block is fetched from or stored into the MS 300 at a time. Memory 3 is connected to the BS 203 with a signal line 320 including a 16-byte data line. When a BS miss occurs, the address of a required block is sent to the MS control circuit 301, and data is fetched from the corresponding block in the MS 300. The transfer control circuit 303 transfers the fetched data to the BS 203 in 16 cycles, 16 bytes at a time. The store processing is controlled in a store-through manner. Accordingly, in store processing, data is stored into the MS 300, and, if a BS hit occurs, the data is also stored in the BS concurrently. The address of the block and a mark signal indicating the area within the block into which the data is to be stored are sent along with the store data to the memory 3.

On detecting a write operation taking place in the MS 300, the coherency control circuit 302 sends a cancel request including the store address, via coherency control signal lines 321, to all other instruction processors than the one which requested that write operation to invalidate the corresponding block in each BS. This control operation is called memory coherency control.

While this embodiment has adopted the particular block size, data transfer width, store control method, and memory coherency control methods, it is to be understood that those are employed merely by way of example rather than of limitation.

Figure 2:
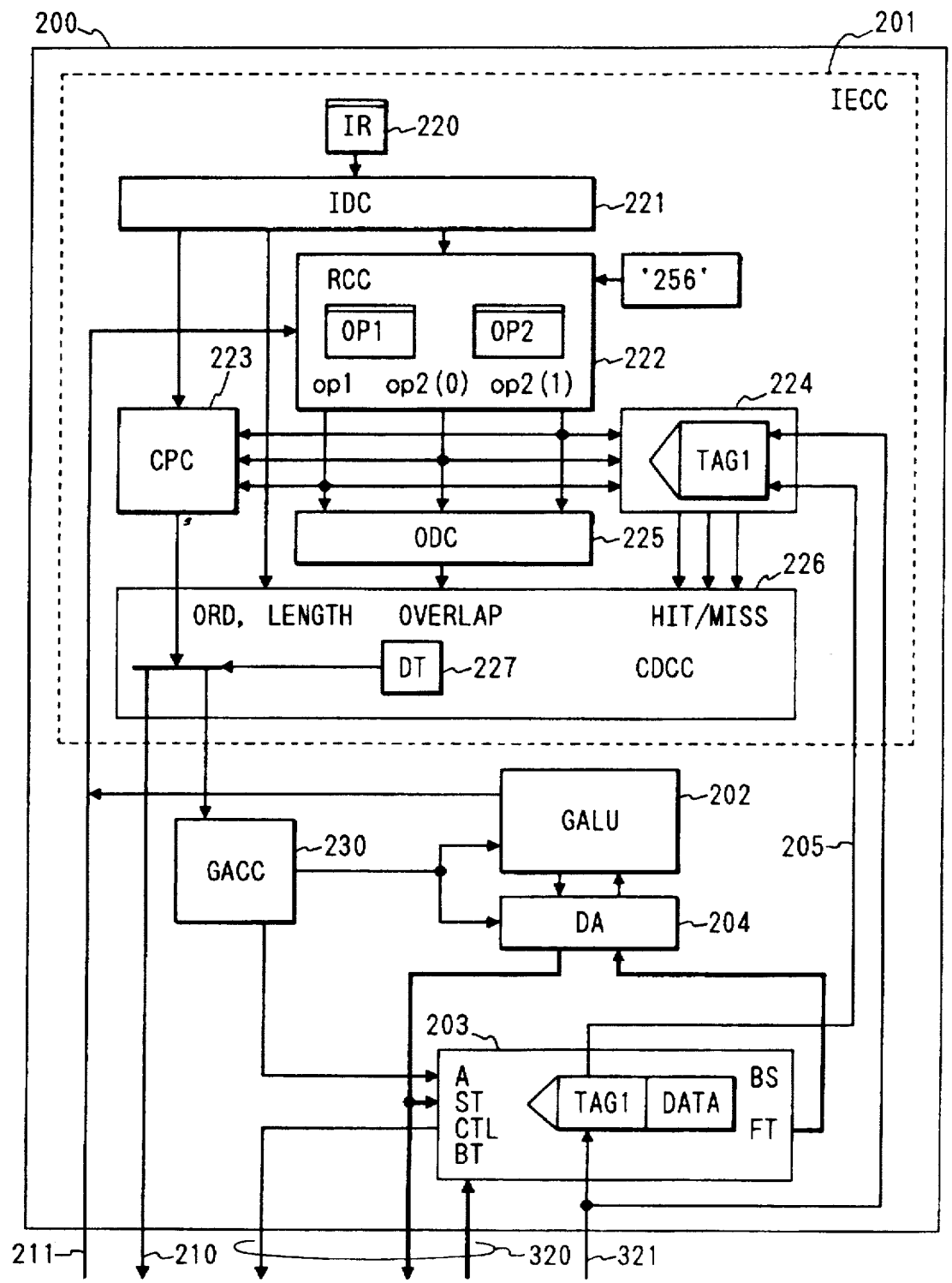
FIG. 2 is a block diagram illustrating an example of the internal configuration of the instruction processor shown in FIG. 2.

FIG. 2 shows the structure of the instruction processor 200. The instruction processor in accordance with the present invention has a function to send a processing command to the auxiliary data processor 1 under certain conditions. The instruction execution control circuit 201 consists of an instruction register (IR) for retaining an instruction which is being executed, an instruction decoding circuit (IDC) 221 for decoding an instruction which is held in the instruction register, a reference control circuit (RCC) 222 for producing operand information comprising first operand information (op1), second operand first half information (op(0)), and second operand second half information (op(1)), a command producing circuit (CPC) 223 for producing a processing command from a decoded instruction and the above operand information, a BS hit/miss decision circuit 224 for deciding hit/miss of the BS for each of the first operand information, the second operand first half information and the second operand second half information, an overlap decision circuit (ODC) 225 for deciding whether operands overlap, and a command destination determining circuit (CDDC) 226 for determining, by making use of a decision table (DT) 227, whether a processing command is to be sent to a general-purpose arithmetic and logical unit control circuit (GLCC) 230 or to the auxiliary data processor 1 via a signal line 210. The details of the decision table 227 will be explained later.

The BS 203 retains tags and data and judges hit/miss by comparing the tags with a reference address. When a hit is detected, data corresponding to the tag is referred to. When a miss is detected, a block transfer request is sent to the memory 3 through the signal line 320. In response to this request, the memory 3 sends data to this BS. The BS receives and stores this data. The BS hit/miss decision circuit 224 has tags therein kept equal to those in the BS 203 by a BS tag coherency control signal line 205. To each tag in the BS is sent a cancel request from the memory 3 through a coherency control signal line 321. If the BS contains a block including an address specified by the cancel request, this block is invalidated.

The reference control circuit 222 determines the first operand information, second operand first half information, and second operand second half information basing on operand addresses provided by an instruction and a block size "256" of the BS 203, and produces a processing command. Where the processing extends over a plurality of blocks, a plurality of processing commands are issued. Since the reference unit of the MS 300 is a block, the first operand is specified so that it may not extend over two blocks. In some cases, the second operand may extend over two blocks while the first operand is so specified that it does not extend over two blocks. In these cases, the part of the second operand which is in the former block is called the first half of the operand and the part in the latter block is called the second half of the operand.

Figures 3, 10:
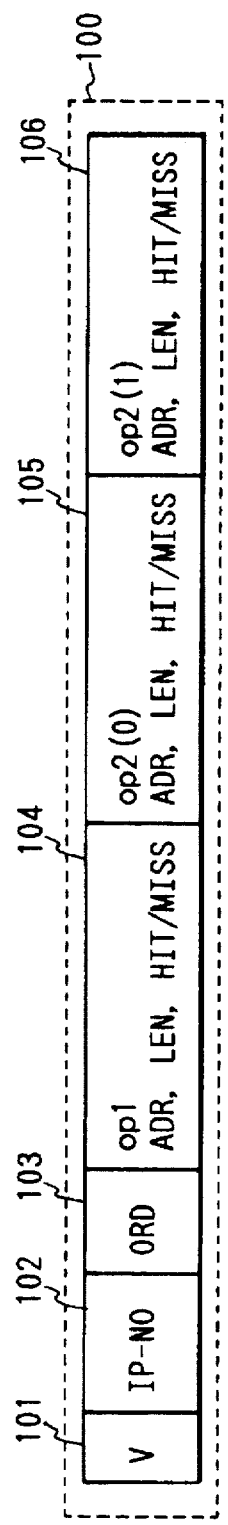
FIG. 3 is an example of the format of a processing command.
FIG. 10 is an example of a decision table for determining a destination of a processing command.

FIG. 3 is a format of the processing command 100. The processing command 100 consists of a plurality of fields. In this embodiment, those are a validity flag 101 indicating that the command is valid, an identification number 102 of the instruction processor which issued this processing command, an order 103 indicating the kind of operation requested by the processing command, the first operand information 104 indicating the starting address, length, etc. of the first operand, the second operand first half information 105 indicating the starting address, length, etc. of the first half of the second operand, and the second operand second half information 106 indicating the starting address, length, etc. of the second half of the second operand. Where the second operand does not extend over two blocks, either the first half information 105 alone or the second half information 106 alone is used to present the starting address, length, etc. of the second operand. As described later, the second operand is treated somewhat differently, according as which field is used. Each of those operand information further includes BS hit/miss information, but this embodiment does not use it.

Returning to FIG. 2, when the command destination determining circuit 226 sends a processing command to the general-purpose ALU control circuit 230, the general-purpose ALU control circuit 230 fetches data specified by the processing command from the BS 203 and sends it to the general-purpose ALU 202 via a data aligner (DA) 204. When a BS miss occurs, the specified data is fetched from the MS 300, registered into the BS, and then sent to the data aligner 204. The general-purpose ALU 202 outputs the operation result via the data aligner 204. Since this embodiment employs the store-through control, the operation result is sent to both the BS 203 and the MS 300. At this point, if a BS hit occurs, the operation result is also stored into the BS, although it is not stored into the BS if a BS miss occurs. The general-purpose ALU 202 also sends a command completion response to the reference control circuit 222.

On the other hand, when the command destination determining circuit 226 sends a processing command to the auxiliary data processor 1, the auxiliary data processor 1, in response to this command, fetches the first operand and the second operand from the MS 300, performs a specified operation on these operands, stores the operation result into the first operand location in the MS 300, and returns a command completion response via a signal line 211.

Again in FIG. 1, the auxiliary data processor 1 consists of a control circuit (CC) 6 which receives a processing command from each instruction processor 200 and controls its execution, a memory reference control circuit (MRCC) 8 which controls access to memory 3, a processing circuit (PC) which processes data fetched from the MS 300, and a tag circuit (TC) 7 which holds and handles management information for data which is temporarily retained in the processing circuit 9.

The control circuit 6 controls the execution of each processing command in a plurality of stages. In this embodiment, they are a P stage for holding processing commands sent from the instruction processors and selecting one of them, a J stage for decoding the selected processing command and judging the requested processing, an R1 stage for fetching the first operand from the MS, an R20 stage for fetching the first half of the second operand from the MS, an R21 stage for fetching the second half of the second operand from the MS and performing the requested processing, and a W stage for storing back the result of processing into the MS and returning a command completion response to the instruction processor which issued the processing command. Each of the processing commands sent from the instruction processors controls the execution of the operation in each stage while transiting registers 10, 20, 30, 40, 50, and 60 which correspond respectively to these stages. The P register 10 is a set of registers P1 to Pn which are assigned to instruction processors I to N. A command selection circuit (CSC) 11 selects one of the processing commands in the P registers 10 on a first-come first-served basis.

The stage transition of processing commands is controlled by a command transition control circuit (CTCC) 21. The command transition control circuit 21 controls the stage transition of successive processing commands so that at most one processing command which refers to the MS may exist throughout the stages R1, R20, R21, and W. The existence of a processing command in a stage is judged from the validity flag in a register corresponding to the stage. Whether or not a processing command refers to the MS is judged from the order, the first operand information, the second operand first half information, and the second operand second half information. For simplicity's sake, FIG. 1 omits the illustration of set signals to the registers corresponding to the stages, and represents in a simplified form the stage transition path for the command. By referring to the stage transition to be explained later in detail using timing diagrams, one of ordinary skill in the art will be able to realize the command transition control circuit 21 with ease.

FIG. 4 summarizes the operations in the respective processing stages to be performed in accordance with the order 103 in the processing command. Since the operations in the R1 and the following stages change according to the content of the order, FIG. 4 shows the R1, R20, R21, and W stages for a move processing, an arithmetic or logic processing, and a byte comparison processing, as examples.

The R1 stage is a stage for fetching the first operand from the MS. If the first operand need not be fetched from the MS, for example, in the case of a move processing, the R1 stage is omitted. The R20 stage is for fetching a block including the first half of the second operand from the MS. If the first half of the second operand need not be fetched from the MS, the R20 stage is omitted. The cases in which this stage is omitted will be apparent from the later description of operations. The R21 stage is for fetching a block including the second half of the second operand from the MS and concatenating it with the first half of the second operand to form a complete second operand data. If necessary, an arithmetic, logic, or other operation is also performed in this stage. In the R21 stage, if the second half of the second operand need not be fetched from the MS, the fetch operation is omitted, and only the concatenation and any of arithmetic, logic, or other operation are performed. The W stage is for storing the result of operation into an area specified by the first operand in the MS and sending a command completion response to the instruction processor. The command completion response includes a signal indicating that the processing command has been executed correctly and a condition code indicating the status of the result. If the result need not be stored into the MS, for example, in the case of a compare processing, the store operation is omitted.

Further in the W stage, data of a block fetched in the R21 stage is stored into data memory (to be explained later) provided within the auxiliary data processor 1 for the purpose of temporary storage. An object of this is, like the mechanism disclosed in the aforementioned reference 1, to retain part of the data which was fetched for a certain processing command and use it for the next processing command, thereby omitting data fetching from the MS. Moreover, the data memory in accordance with the present invention has a plurality of entries and can retain data of a plurality of blocks in order to execute processing commands from a plurality of instruction processors in parallel. The R20 stage is omitted if data specified by the first half of the second operand in a processing command is retained in any entry of the data memory.

Returning to FIG. 1, the processing circuit 9 in the auxiliary data processor 1 includes a first fetch data register (FDR1) 91, a second fetch data register (FDR2) 92, a data memory (DM) 93 having a plurality of entries, a data concatenation circuit (DCC) 94, a special-purpose ALU (SALU) 95, and an operation result register (ORR) 96. The first fetch data register 91 and the second fetch data register 92 respectively receive the first and second operands fetched from the MS. The content of the second fetch data register 92 is stored into one of the entries of the data memory 93. The data concatenation circuit 94 concatenates part of data fetched from one of the entries of the data memory 93 with part of data fetched from the MS to form data of one block length. The special-purpose ALU 95 performs an arithmetic or logic operation on the output of the data concatenation circuit 94 and data stored in the first fetch data register 91 and outputs the result to the operation result register 96. The result of operation consists of a condition code (CC), operation result data (SDR1), and a mark signal (M).

The tag circuit (TC) 7 includes a tag register 71 and a hit/miss decision circuit (H/MDC) 72. The tag register 71 has as many entries as the data memory 93 has. Each entry consists of a validity flag (V), an instruction processor number (IP), and the starting address and length (ADR, LEN).

The entries of the tag register 71 are kept in a one-to-one correspondence to those of the data memory 93 by means of selectors 51 and 73 and entry designation information (T). The hit/miss decision circuit 72 manages the tag register 71, and particularly collates the instruction processor number and the first half of the second operand sent from the control circuit 6 with the content of each entry of the tag register 71.

A reference control signal selecting circuit 33 is used in the R1, R20, R21, and W stages when the MS is referred to. A data memory address selecting circuit 51 is used in the R21 and W stages when data fetched from the MS into the preceding stage is stored into the data memory 93. A tag register store signal selecting circuit 34 is used in the R20 and R21 stages when the instruction processor number, and the starting address and length for the data fetched from the MS is stored into the tag register 71. However, as mentioned above, the command transition control circuit 21 controls the transition so that at most one processing command referring to the MS may exist throughout these stages. Therefore, none of these selecting circuits will be used by a plurality of processing commands at a time.

Above was explained the outline of the configuration of the system illustrated in FIG. 1. In the explanations below, the operations of this system will be explained in detail using specific operation examples. The details of the system configuration will be apparent from the explanation of operations set forth below.

Figure 5:
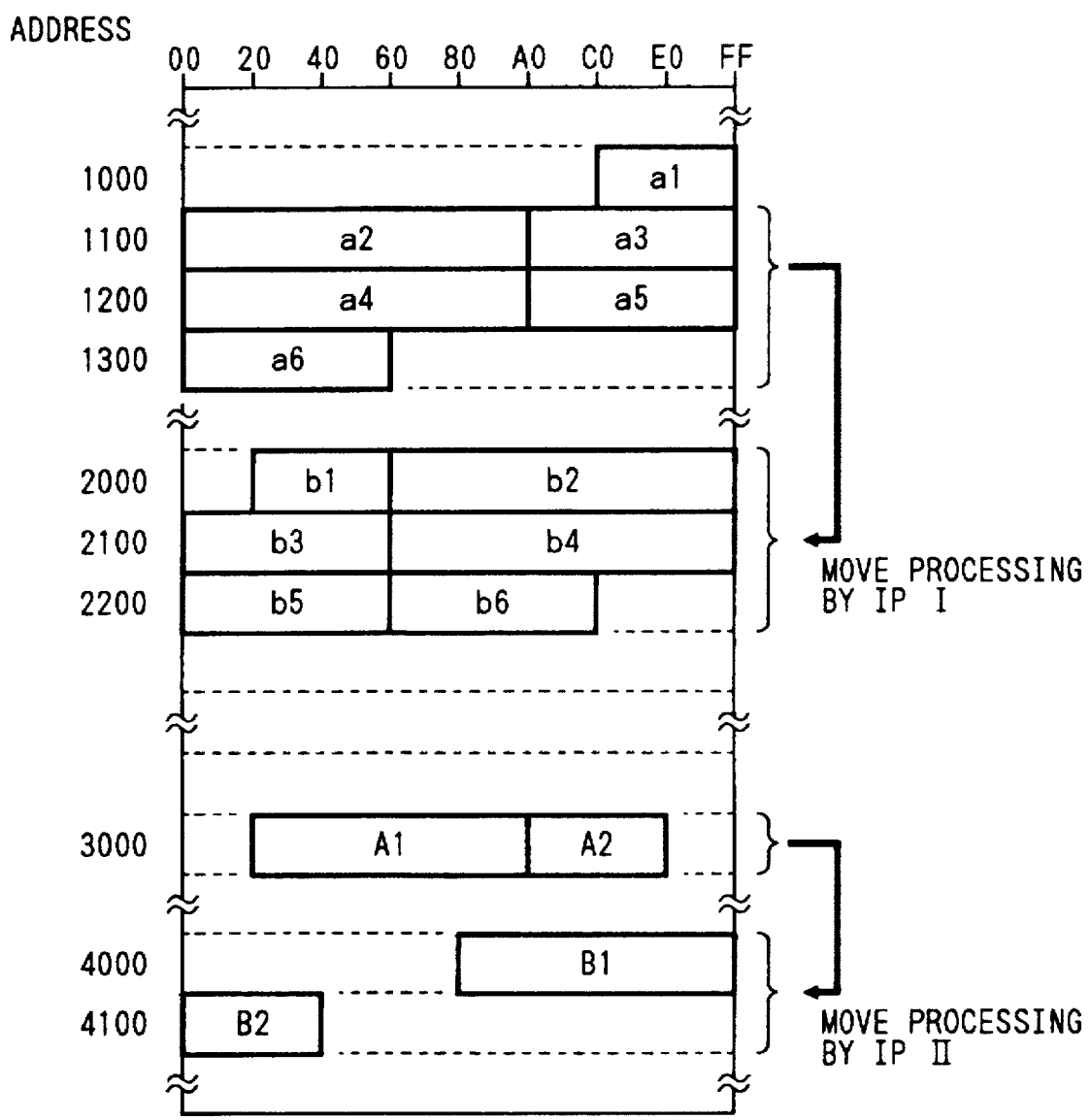
FIG. 5 is a conceptual diagram of move processings.

FIG. 5 is a conceptual showing of an example of the move processing. In this example, the instruction processor I moves data from addresses 10C0 through 135F to addresses 2020 through 22BF, and at the same time the instruction processor II moves data from addresses 3020 through 30DF to addresses 4080 through 413F. For the sake of simplicity of explanation, these data areas are divided into a plurality of areas which are identified by symbols a1 to a6, b1 to b6, A1 to A2, and B1 to B2, as shown in the figure.

For example, the area "a1" indicates a data area of addresses 10C0 to 10FF. A symbol including a hyphen is used to indicate the whole of consecutive areas. For example, "b1-2" indicates an area consisting of the area b1 and the area b2, that is, a data area of addresses 2020 through 20FF.

To execute the above-described move processing, the instruction processor I issues processing commands labeled T11, T12, and T13 in that order. The command T11 instructs to move data from the areas a1 and a2 to the area b1-2, and processing commands T12 and T13 similarly specify respective source and destination addresses, thereby moving data from the area a1-6 to the area b1-6. The instruction processor II issues processing commands T21 and T22 in sequence and moves data from the areas A1 and A2 to the areas B1 and B2, respectively.

The area A1 is specified by the second operand second half information rather than by the second operand first part information in order to store data in the area A2, which is fetched along with data in the area A1 by this processing command T21, into the data memory 93 in the W stage. In the second operand first half field of the processing command T21 is set a code indicating "Invalid" ("–" in the figure). In the processing command T22, the area A2 is specified by the second operand first half information in order to use data of the area A2 stored in the data memory, thereby omitting the R20 stage. The second operand second half field of the processing command T22 also contains the code indicating "Invalid."

This example uses three kinds of orders: TS, T, and TR. The first letter "T" indicates a move processing. This letter is replaced by "C" for a compare processing or by "O" for a logical OR processing. The succeeding character indicates the first or last command of a command sequence. "S" (Set) is used for the first command, and "R" (Reset) is used for the last command. "SR" is used for a solitary command, that is the first and last command.

Figure 6:
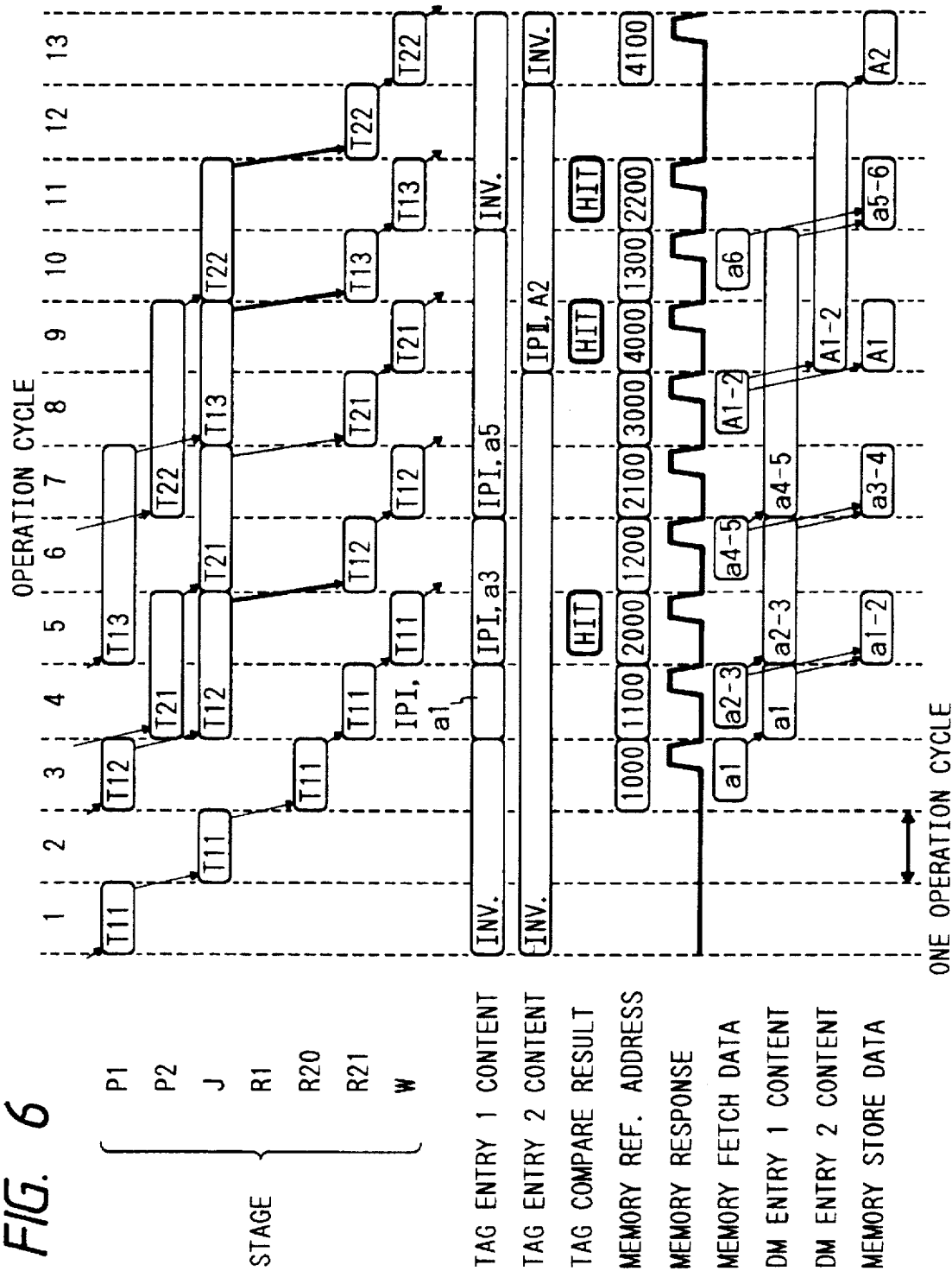
FIG. 6 is a timing diagram for the execution of the move processings shown in FIG. 5.

FIG. 6 is a timing diagram according to which the auxiliary data processor 1 illustrated in FIG. 1 executes the move processing illustrated in FIG. 5. The auxiliary data processor 1 advances the processing through a plurality of operation cycles. In one operation cycle, a processing command has the operation in one stage carried out and can transits to the next stage.

First, the processing command T11 sent from the instruction processor I is held in the P1 register (10) in operation cycle 1. At this point, as the P register 10 contains no other command, the processing command T11 is sent to the J register 20 via the command selection circuit 11.

In operation cycle 2, the processing command T11 is held in the J register 20. As the order in the command T11 indicates "move processing," a R1 stage transition decision circuit 23 judges that the R1 stage is not required, and sends this command to the "n" side output of the R1 stage transition selection circuit 24. Consecutively, as the command T11 includes the second operand first half information, this second operand first half information and the instruction processor number are sent to the hit/miss decision circuit 72. As the tag register 71 has no valid entry, the hit/miss decision circuit 72 allocates an entry number "1" to this command, and informs an R20 stage transition decision circuit 31 that a tag register miss has occurred and that an entry number "1" has been allocated to the command. The allocated entry number is set in the T field of the R20 register 40, and is moved therefrom to the T field of the R21 register 50 and then to the T field of the W register 60 as the processing command transits. The R20 stage transition decision circuit 31 judges that the command T11 requires to fetch the first half of the second operand from the MS, and sends the command T11 to the R20 register 40 via the "y" side output of an R20 stage transition selection circuit 32.

In operation cycle 3, the command T11 is held in the R20 register 40. A reference control signal for a block containing the area a1 is produced according to the second operand first half information held in the R20 register, and is sent to the MS 300 via the reference control signal selecting circuit 33, the memory reference control circuit 8, and the MS control circuit 301. The data which is in a block including the area a1 and is fetched from the MS 300 is transferred to the processing circuit 9 via the MS control circuit 301 and the memory reference control circuit 8. The MS control circuit 301 returns a memory response indicating that data was read out of a specified block to the memory reference control circuit 8. The end of operation cycle 3 is decided according to this response. Not only the operation cycle 3 but also any other operation cycle ends on receipt of the memory response. On receipt of the memory response, the command T11 is sent to the R21 register 50, and the data of a block including the area a1 is sent to the second fetch data register 92. The starting address and length of the area a1 and the instruction processor number in the command T11 are stored into the entry 1 of the tag register 71. At the same time, the validity flag of this entry is set to "1."

In operation cycle 4, the command T11 is held in the R21 register 50. Data in a block including the area a2 (area a2-3) is fetched from the MS 300 according to the second operand second half information in a manner similar to that in the R20 stage. Consecutively, the data in a block including the area a1 held in the second fetch data register 92 is stored into the entry 1 of the data memory 93, and this data is also sent to the data concatenation circuit 94 along with the data of the area a2-3 fetched from the MS. The data concatenation circuit 94 composes data of the area a1-2 from the input data in accordance with the second operand first half information and the second operand second half information in the R21 register, and sends the composed data to the special purpose ALU 95. The special-purpose ALU 95 produces operation result data, a mark signal, and a condition code in accordance with the order and the first operand information. As the order in the command T11 indicates "move processing," the content of the first fetch data register 91 is ignored. On receipt of a memory response, the command T11 is sent to the W register 60, the operation result to the operation result register 96, and the data of the area a2-3 to the second fetch data register 92, respectively. The starting address and length of the area a3 calculated from the starting address and length of the area a2 plus the instruction processor number are stored into the entry 1 of the tag register 71.

In operation cycle 5, the command T11 is retained in the W register 60. The address of the area b1-2 is produced in accordance with the first operand information held in the W register and is sent to the MS 300 along with the operation result held in the operation result register 96 via the memory reference control circuit 8 and the MS control circuit 301. The operation result data is then stored into the MS. The data of the area a2-3 held in the second fetch data register 92 is stored into the entry 1 of the data memory 93. When a memory response is received, a command completion response including a condition code is sent, via a command completion response distributing circuit 61, to the instruction processor I which issued this processing command. When the operation result data is stored into the MS, the coherency control circuit 302 receives the store address from the MS control circuit 301, and sends a cancel request to the BS 203 in each instruction processor 200 via the coherency control signal lines 321 for the instruction processors. Consequently, in each BS, if data of a block in which a store operation took place exists, this data is invalidate, whereby incoherency between MS data and BS data is prevented. The cancel request is also sent to the auxiliary data processor 1 via a coherency control signal lines 311 for the auxiliary data processor. If the data memory 93 in the auxiliary data processor 1 contains data of the identical block, this data is invalidated. This invalidation processing will be explained later in detail.

In this way, the command T11 moves data from the area a1-2 to the area b1-2 and leaves the data of the area a2-3 in the entry 1 of the data memory 93. The data of the area a2 is not required by the next command T12 and it is enough if only the data of the area a3 is retained. In this embodiment, however, the data of the area a2 is also stored into the data memory 93. This is because a circuit for extracting only the data of the required area (area a3 in this example) has been omitted. Nevertheless, no error will result from the fact that the data held in the data memory 93 includes the data of the area a2, since the tag register 71 holds only the reference information for the area a3 and the data concatenating circuit 94 refers to the second operand first half information (i.e., a3 in the next command T12).

As a result of the command T11's having been held in the J register 20 in the operation cycle 2, the command T12 is held in the P1 register in the operation cycle 3. Subsequently, after the command T11 is held in the R20 register 40 in the operation cycle 3, the command T12 is held in the J register in the operation cycle 4. As mentioned above, the command transition control circuit 21 controls the transition so that at most one processing command referring to the MS may exist throughout the stages R1, R20, R21, and W. Consequently, the command T11 is inhibited from moving to the next register by a command transition control gate 22 until the command T11 is judged to finish the W stage. Therefore, the command T12 remains in the J register 20 till the end of the operation cycle 5.

In operation cycle 5, when the command T11 is judged to finish the W stage, the command T12 passes through the command transition control gate 22. As the order in the command T12 indicates "move processing," the R1 stage transition decision circuit 23 judges that the R1 stage is not required, and sends this command to the "n" side output of the R1 stage transition selection circuit 23. The hit/miss decision circuit 72 receives the second operand first half information (a3) and the instruction processor number in the command T12, ascertains that they are respectively equal to the data area information and the instruction processor number registered in the entry 1 of the tag register 71, and informs the R20 stage transition decision circuit 31 that a tag register hit has occurred and that the entry 1 retains the area a3 indicated by the second operand first half information. Note that, as a result of the processing of the command T11 in operation cycle 4, the starting address and length of the area a3 and the identification number of the instruction processor I have been retained in the entry 1 of the tag register 71 in the operation cycle 5. Thus, the R20 stage transition decision circuit 31 judges that the command T12 does not require fetching the first half of the second operand from the MS, and sends the command to the R21 register 50 via the "n" side output of the R20 stage transition selection circuit 32. The entry number "1" delivered from the hit/miss decision circuit 72 is also sent to the T field of the R21 register. When the tag register hits, that is, when the required data exists in the data memory 93, the R20 stage is bypassed. This is one of the features of the present invention.

In operation cycle 6, the command T12 is retained in the R21 register 50. Data of the area a4-5 is fetched from the MS 300 in accordance with the second operand second half information in the R21 register in a manner similar to that in the R20 stage. Then, the data of a block including the area a3 is fetched from the entry 1 of the data memory 93. The data concatenation circuit 94 composes data of the area a3-4 from the data fetched from the data memory and the data fetched from the MS and sends the composed data to the special purpose ALU 95. On receipt of a memory response, the command T12 is sent to the W register 60, the operation result to the operation result register 96, the data of the area a4-5 to the second fetch data register, and the starting address and length of the area a5 and the instruction processor number to the entry 1 of the tag register 71, respectively.

In operation cycle 7, the command T12 is retained in the W register 60. Just as in the case of the command T11, the operation result is stored into the area b3-4 in the MS 300, and the data of the area a4-5 in the second fetch data register 92 is stored into the entry 1 of the data memory 93. Further a command completion response is sent to the instruction processor I, and the memory coherency control is performed.

In this way, the command T12 moves data from the area a3-4 to the area b3-4 and leaves the data of the area a4-5 in the data memory 93.

On the other hand, the command T21 sent from the instruction processor II is retained in the P2 register 10 in the operation cycle 4, stays there until the command T12 leaves the J stage, and is held in the J register 20 in operation cycle 6. The subsequent processing of the command T21 is approximately the same as that of the command T11 except that the R20 stage is not required since the second operand first half information is invalid and that the entry 2 is allocated to the command T21. Thereafter, the commands T13 and then T22 are executed in a manner similar to that of the command T12.

In this way, the instruction processor I can move data from the area a1-6 to the area b1-6 and at the same time, the instruction processor II can move data from the area A1-2 to the area B1-2. Different entries of the data memory 93 are allocated to different instruction processors and this allocation is indicated by the tag circuit 7. Therefore, the processing command sequence issued by the instruction processor I are executed independently of the processing command sequence issued by the instruction processor II without interfering with each other. For example, although the command T21 issued by the instruction processor II is executed between the commands T12 and T13 issued by the instruction processor I, the command 13 is executed, using the data retained by the command T12 in the data memory, through a normal stage transition as if the command T21 were not executed except that the execution of the command 13 is delayed a little.

As apparent from the above explanation, the auxiliary data processor 1 in accordance with this invention accomplishes move processing of a large amount of data in the MS without using the general-purpose ALU 202 and the BS 203 in the instruction processor 200. Since the BS is not used and consequently not occupied by the moved data, no cache pollution causing performance reduction occurs.

In this embodiment, each time a processing command tries to use data held in the data memory 93, the auxiliary data processor checks whether the data is the required one by comparing its address and length with the information stored in the tag register. Accordingly, even when every processing command uses a T order, no difficulty will arise. Similarly, even when every processing command uses a TSR order, the required data will be fetched from the MS and no malfunction is caused. In this case, the required data must be fetched each time from the MS, and therefore the performance goes down.

However, note that move processing can be performed without the tag circuit 7 and the data memory 93. For example, this mode of operation can be used when the tag circuit 7 becomes faulty.

Furthermore, processing of wrong data is completely prevented since the instruction processor number and the address and length of data are retained in the tag register 71 and are collated with the corresponding information in the processing command. For example, even if an entry allocated to a certain instruction processor is accidentally allocated to another instruction processor halftway in the execution and its content is replaced by another data, this is reflected on at least either the instruction processor number or the data address and length held in the tag register. If the instruction processor number has been changed, it can be recognized that the data has been replaced by another instruction processor. Also, if the address and length of data have been changed, it can be detected that the required data does not exist. In these cases, the required data is fetched again from the MS, by which malfunctioning is prevented. An example of these cases will be discussed later with reference to FIG. 13. Most malfunctions will be prevented merely by registering either the instruction processor number or the data address and length in the tag register.

Figure 7:
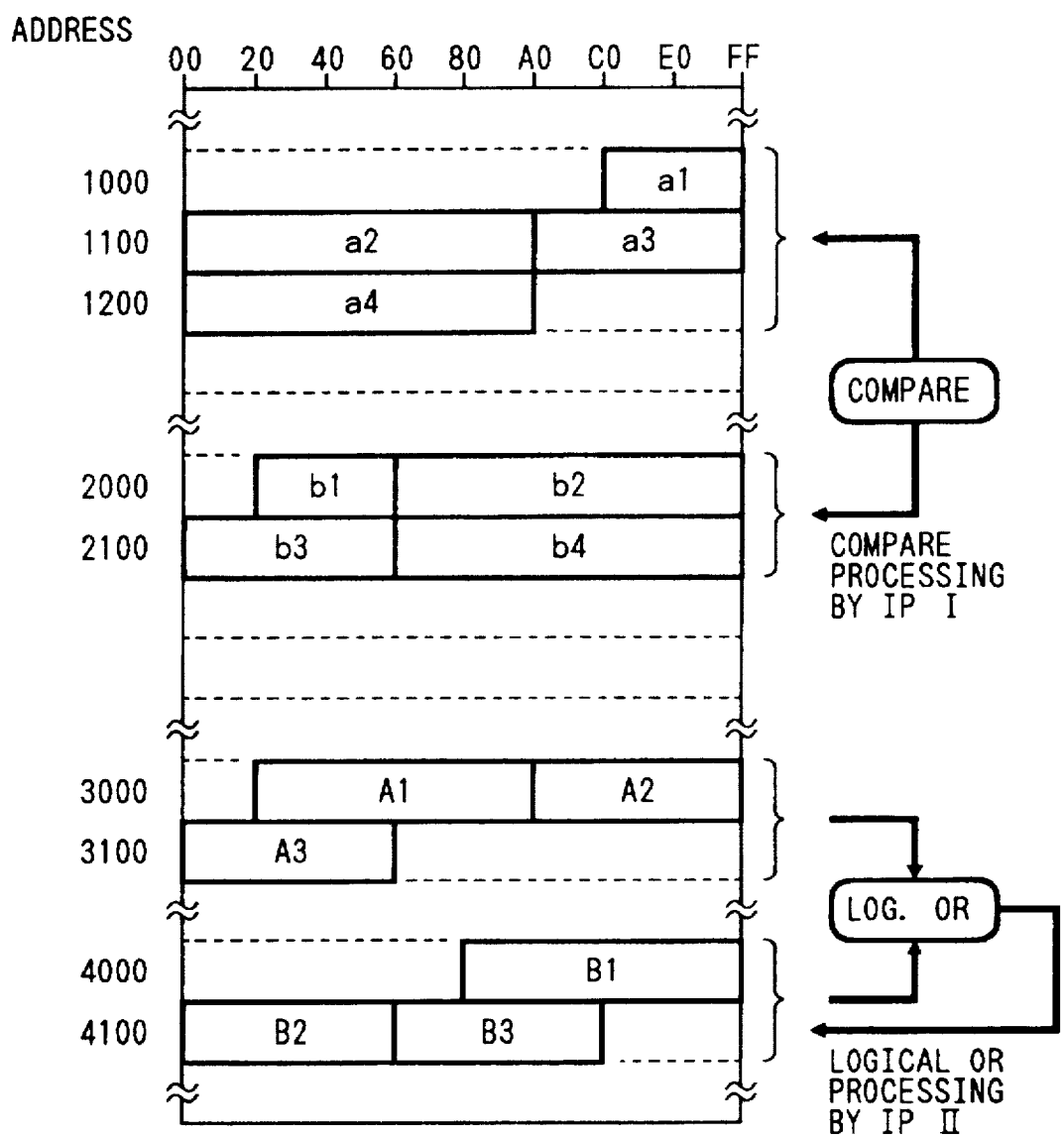
FIG. 7 is a conceptual diagram of a compare processing and a logical OR processing.

FIG. 7 conceptually depicts an example of compare processing and logic processing. While the above-described move processing performs one operand fetch operation, and one store operation for each processing command, compare processing performs two operand fetch operations but no store operation and logic processing performs two operand fetch operations and one store operation. The auxiliary data processor 1 illustrated in FIG. 1 can also execute processing which requires such a type of data reference.

In this example, the instruction processor I compares data at addresses 10C0 TO 129F with data at addresses 2020 to 21FF, and at the same time the instruction processor II computes a logical sum of data at addresses 3020 to 315F and data at addresses 4080 to 41BF and stores the result at addresses 4080 to 41BF. The instruction processor I issues processing commands labeled C11 and C12 in that order. The order set in each of these commands begins with a character C which stands for "Compare." The command C11 requires comparison of data of the area a1-2 with data of the area b1-2, and the command C12 requires comparison of data of the area a3-4 with data of the area b3-4. As a whole, these commands compare data of the area a1-4 with data of the area b1-4. On the other hand, the instruction processor II issues processing commands O21 and O22 in that order. These commands require a logical OR operation on data of the area A1-3 and data of the area B1-3, and storing the result into the area B1-3. The order of each of these commands begins with a character O which stands for "OR" (logical sum).

Figure 8:
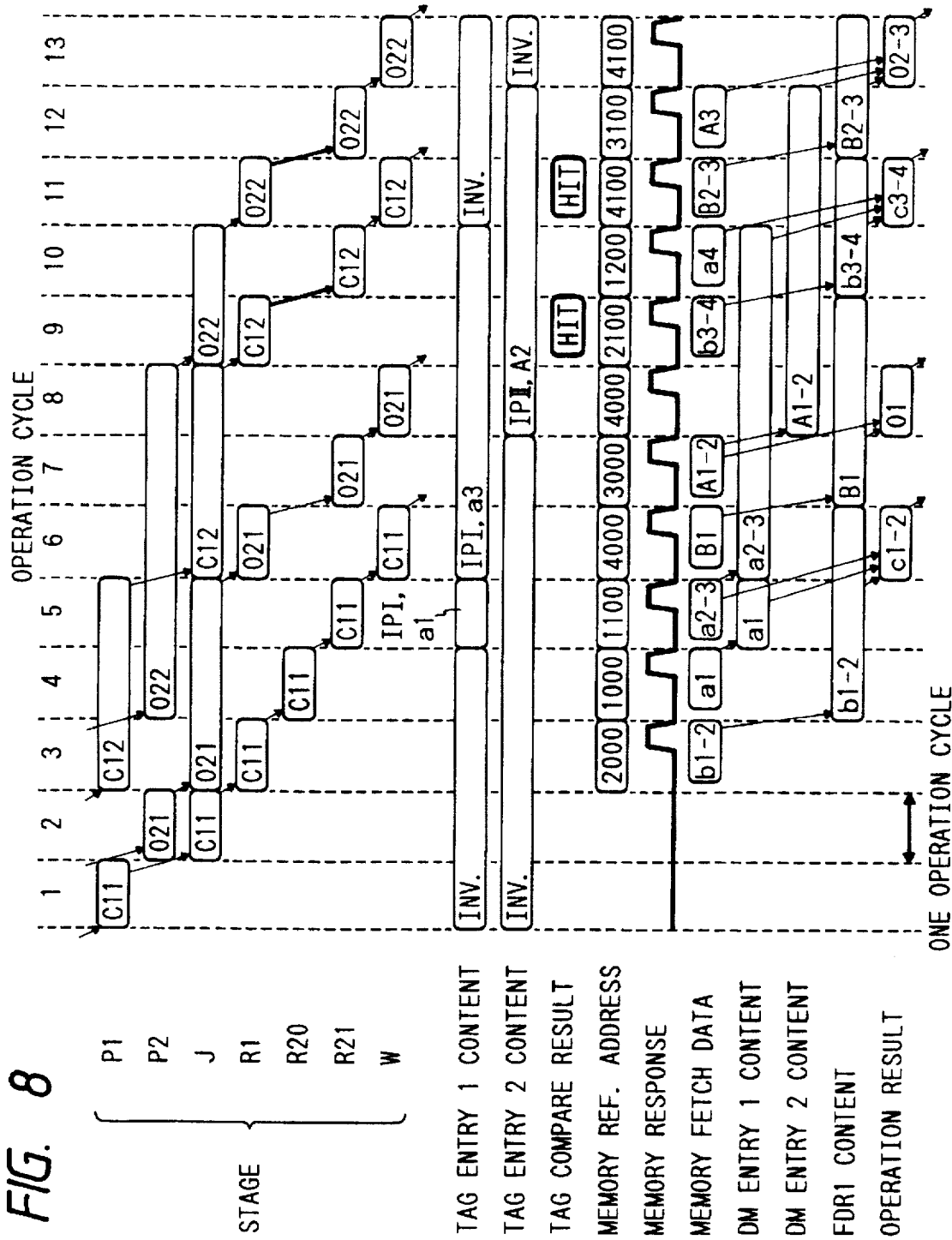
FIG. 8 is a timing diagram for the execution of the compare processing and logical OR processing shown in FIG. 7.

FIG. 8 is a timing diagram according to which the auxiliary data processor 1 illustrated in FIG. 1 executes the processing illustrated in FIG. 7.

First, the command C11 sent from the instruction processor I is held in the P1 register (10) in operation cycle 1. At this point, the command C11 is immediately sent to the J register 20 since the P register 10 retains no other command.

In operation cycle 2, the command C1 is held in the J register 20. As the order in the command C11 is "C" standing for "Compare," the R1 stage transition decision circuit 23 judges that the R1 stage is required and sends this command to the "y" side output of the R1 stage transition selection circuit 24.

In operation cycle 3, the command C11 is held in the R1 register 30. A reference control signal for a block including the area b1-2 is produced in accordance with the first operand information held in the R1 register. Data in this block is fetched from the MS 300 and sent to the first fetch data register 91. As the command C11 has the second operand first half information, this information and the instruction processor number are sent to the hit/miss decision circuit 72. As the tag register 71 has no valid entry, the hit/miss decision circuit 72 informs the R20 stage transition decision circuit 31 that a tag register miss occurred and that the entry 1 is allocated to the command. The command C11 is sent to the R20 register 40.

In operation cycle 4, the command C11 is retained in the R20 register 40. Data of a block including the area a1 is fetched from the MS 300 in accordance with the second operand first half information held in the R20 register, and sent to the processing circuit 9. Further, the command C11 is sent to the R21 register 50 and the data of a block including the area a1 is sent to the second fetch data register 92. The starting address and length of the area a1 and the instruction processor number are sent to the entry 1 of the tag register 71.

In operation cycle 5, the command C11 is retained in the R21 register 50. Data of the area a2-3 is fetched from the MS 300 in accordance with the second operand second half information held in the R21 register. Then, the data of a block including the area a1 held in the second fetch data register 92 is stored into the entry 1 of the data memory 93, and this data and the data of the area a2-3 fetched from the MS are sent to the data concatenation circuit 94. The data concatenation circuit 94 composes data of the area a1-2 in accordance with the second operand first half information and the second operand second half information set in the R21 register, and sends the composed data to the special-purpose ALU 95. The special purpose ALU 95 compares the data (a1-2) sent from the data concatenation circuit 94 with the data (b1-2) sent from the first fetch data register 91 in accordance with the order and the first operand information set in the R21 register, and produces a condition code CC indicating the result. On receipt of a memory response, the command C11 is sent to the W register 60, the condition code to the operation result register 96, the data of the area a2-3 to the second fetch data register 92, and the starting address and length of the area a3 and the instruction processor number to the entry 1 of the tag register 71.

In the operation cycle 6, the command C11 is retained in the W register 60. As the order set in the command C11 indicates "compare processing," storing into the MS is not performed, but a command completion response is sent along with a condition code to the instruction processor I which issued this processing command. The data of the area a2-3 held in the second fetch data register 92 is stored into the entry 1 of the data memory 93.

In this way, the command C11 compares the data of the area a1-2 with the data of the area b1-2.

The command C12 issued subsequently to the command C11 is held in the R1 register 30 in operation cycle 9, and fetches the first operand (b3-4) from the MS 300 into the first fetch data register 91. In operation cycle 10, the command C12 is retained in the R21 register 50, bypassing the R20 stage. The R20 stage is bypassed because it it judged that fetching from the MS is not required as the data specified by the second operand first half information is retained in the entry 1 of the data memory 93. The explanation of this mechanism is omitted here because it was already given in the description of move processing. In operation cycle 10, the data of the area a4 specified by the second operand second half information is fetched from the MS 300, and is concatenated with the data of the area a3 in the data memory 93 to form the data of the area 3-4. The special-purpose ALU 95 compares this data with the data of the area b3-4 in the first fetch data register 91.

On the other hand, the command O21 sent from the instruction processor II is retained in the P2 register (10) in operation cycle 2, and is retained in the J register 20 in operation cycles 3 to 5. This is because the preceding command C11 refers to the MS until the operation cycle 5, as explained above. The command O21, having the first operand information, is retained in the R1 register 30 in operation cycle 6, and fetches the data of a block containing the area B1 from the MS 300 into the first fetch data register 91. AT the same time, the entry number "2" is allocated to this command. In the following operation cycle 7, the command O21 is retained in the R21 register 50, bypassing the R20 stage because the command O21 does not have the second operand first half information, and the operation in the R21 stage takes place. As the result, the data of a block including the area A1-2 is fetched and a logical sum of the data of the area B1 and the data of the area A1 is calculated, the result of which is sent to the operation result register 96. In operation cycle 8, the command O21 is retained in the W register 60, and stores the result of operation into the MS 300 and the data of a block including the area A1-2 into the entry 2 of the data memory 93, and sends a command completion response to the instruction processor II.

The command O22 sent subsequently to the command O21 waits until the command C12 performs the last reference to the MS in the R21 stage, and is then retained in the R1 register 30 in operation cycle 11 to fetch the first operand (B2-3) from the MS 300. The R20 stage is bypassed since the data of the area A2 specified by the second operand first half information is retained in the entry 2 of the data memory 93. In operation cycle 12, the command O22 is retained in the R21 register, fetches the second half of the second operand (A3) from the MS 300, concatenates it with the first half (A2) of the second operand in the entry 2 of the data memory 93 into data of the area A2-3, and compares it with the first operand (B2-3).

As apparent from the above explanation, the auxiliary data processor 1 illustrated in FIG. 1 can accept processing commands requiring move, compare, and logical OR processings from the instruction processors 200, and execute them independently.

In the above explanation, the first operand can be the object of fetch, store, or both processings and the second operand can be the object of only fetch processing. However, the fetch/store functions for the operands is not limited to this particular combination. These functions can be changed easily by changing the operand fields in the processing command to be used for producing MS reference control signals in various processing stages. The number of operands of each processing command is not limited to two. This is a problem of the selection of the processing command format and the number of processing stages. Further, the above embodiment example does not limit the processing types to move, compare, and logical OR processings. It is easy to assign an adequate order code to a required processing and add a required processing circuit to the special-purpose ALU 95.

Figure 9:
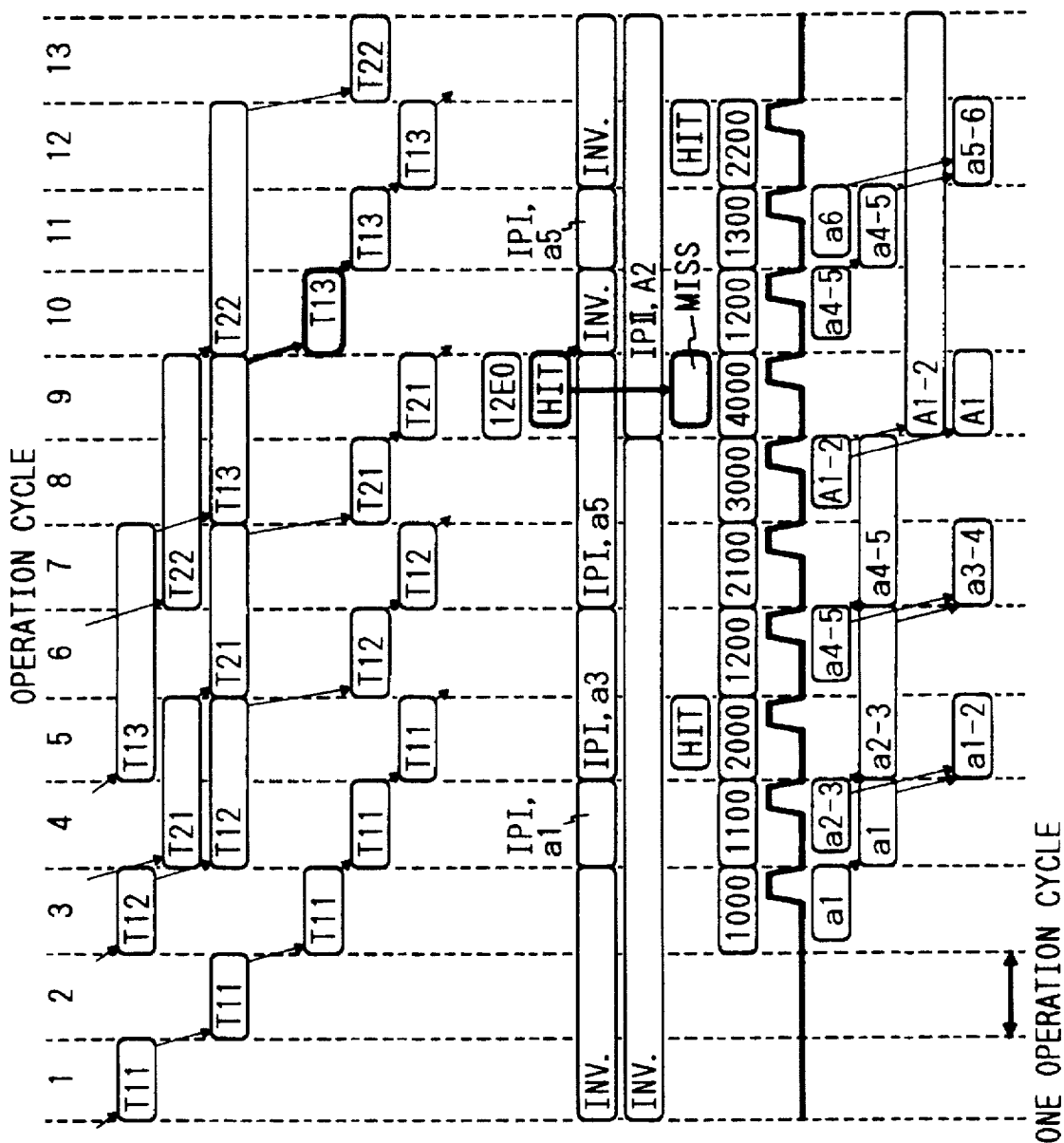
FIG. 9 is a timing diagram for the execution of the move processings under memory coherency control.

Next is explained that memory coherency control is accomplished assuredly. FIG. 9 is a timing diagram according to which a coherency control signal is sent from the memory 3 and invalidates data held in the data register 93 during the move processing illustrated in FIG. 5.

The following explains a case where a memory coherency control signal is sent from the memory, and invalidating and re-fetching of data take place with respect to the area a5. Where the invalidation of data by coherency control does not take place, the data of the area a5 is stored into the entry 1 of the data memory in operation cycle 7, and is fetched from there in operation cycle 10, as shown in FIG. 6. Therefore, the most critical case is where the memory coherency control is carried out in operation cycle 9 and this data is invalidated. Accordingly, this case will be explained in detail below.

In operation cycle 9, when an address (12E0) belonging to the area a5 arrives as a coherency control address from the coherency control circuit 302 via the coherency control signal line 311 for the auxiliary data processor, the memory reference control circuit 8 sends this address to the tag circuit 7 via a tag control line 81 for coherency control. The hit/miss decision circuit 72 searches the tag register 71 for an entry which retains an address corresponding to the coherency control address. In this case, the entry 1 hits. The hit/miss decision circuit 72 then resets the V bit of the entry 1 to "0" which indicates that there exists no valid data and thus invalidates the entry 1. Toward the end of this operation cycle, the command T13 requests a search for the area a5. However, as the entry 1 retaining the address of the area a5 has been invalidated, the hit/miss decision circuit 72 returns "Miss," and at the same time assigns the entry 1 which is empty (invalid) by this time to the command T13.

Consequently, the command T13 does not skip to the R21 stage, but moves to the R20 stage in operation cycle 10, and fetches the data of the area 4-5 from the MS 300. In operation cycle 10, the latest data of the area a5 has been retained in the MS, and the command T13 can carry out the processing using this latest data. The address and length of the area a5 and the instruction processor number in the command T13 are registered into the newly assigned entry 1 of the tag register 71.

As this embodiment performs the memory coherency control by invalidation, if the data at a data transfer destination is retained in the BS, a BS entry containing this data is invalidated. It is expected that such an affair would rarely happen, but it can be avoided by judging before issuing a processing command whether the data transfer destination area exists in the BS. Its details will be explained later.

Now an explanation will be given of the selective use of the general purpose ALU 202 in the instruction processor 200 and the auxiliary data processor 1. By selecting and using these appropriately, a large amount of data can be processed at a high rate with a minimal cache pollution. This selection function is accomplished according to the decision table 227 by a command destination decision circuit 226 (FIG. 2) provided within the instruction processor 200.

FIG. 10 shows an example of the decision table 227. The decision table 227 indicates the destination of each processing command depending upon whether an operand overlap occurs, as decided by the overlap decision circuit 225; the operand length and whether the first operand is to be updated, as provided by the instruction decoding circuit 221; and the result of a BS hit/miss decision for each operand, as decided by the hit/miss decision circuit 224. The symbol "–" in the figure represents that the corresponding information value does not affect the decision.

The overlap decision circuit 225 detects a processing command whose particular operands overlap each other, that is, store data in the first operand becomes fetch data in the second operand. Such an operand overlap makes processing complicated since the store data must be reflected upon the second operand. In order to simplify the structure of the special-purpose ALU 95, this embodiment sends a processing command whose operands overlap to a general-purpose ALU 202 which can handle overlapping operands. It is easy to modify the special-purpose ALU 95 so that it can handle overlapping operands and omit the overlap decision circuit 225.

Next, the operand length is compared with a value which is predetermined according to the capacity of the BS. In the case that the operand length is sufficiently smaller than the capacity of the BS, the cache pollution will be tolerable enough. Therefore, when the operand length is smaller than that predetermined value, the general-purpose ALU 202 is selected. The smaller the predetermined value is, the greater the effect to prevent the cache pollution becomes. The predetermined value can thus be "0." In the case where the operand length is not smaller than the above predetermined value and the first operand is to be updated, the result of the hit/miss decision for each operand is taken into account. In the case where the first operand hits, if the auxiliary data processor 1 is used, the first operand retained in the BS will be invalidated by the memory coherency control. Therefore, a selection is made so that the number of block transfers from the MS to the BS becomes as small as possible. More particularly, when the first operand hits and at least one of the first and second halves of the second operand hits, the general-purpose ALU 202 is selected. If the first or second half of the second operand is not used, that half is judged to hit. In this case, one block transfer can occur.

In the case where the first operand hits and both the first and second halves of the second operand miss, the use of the general-purpose ALU would cause two block transfers to occur. To prevent this, the auxiliary data processor 1 is selected. In this case, the first operand retained in the BS is invalidated, although no block transfer occurs. When a later processing requires the data of this first operand, a block transfer occurs. However, this single block transfer is all that becomes additionally necessary. When the first operand misses, the auxiliary data processor 1 is selected since the first operand is not in the BS. In the case where the first operand is not to be updated, invalidation by the memory coherency control will not occur, and therefore the auxiliary data processor 1 is selected. In this manner, it becomes feasible to process a large amount of data at a high rate with a minimized cache pollution by adequately selecting command destinations depending upon the hit/miss states of each operand. The combinational condition of the decision table shown in FIG. 10 is only an example and is not limited to this combination. For example, the auxiliary data processor 1 may be selected regardless of the hit/miss state of each operand if only the operand length is larger than a predetermined value. Further in the case where the first operand is to be updated and exists in the BS, the general-purpose ALU 202 may be selected regardless of the hit/miss state of second operand. Furthermore, it is preferable to modify the content of the decision table in harmony with the BS store control method (store-through or store-in) so that the number of block transfers may be the smallest.

The data memory 93 can have any number of entries, but it is recommended that they are evenly assigned to all instruction processors and the instruction processors can operate independently without interfering with each other. For this purpose, the number of entries should preferably be at least equal to the number of the instruction processors. In the case where the number of entries is equal to the number of the instruction processors, registration of instruction processor numbers in the tag register can be omitted by making the instruction processor number and the entry number assigned thereto equal.

If the number of the entries is less than the number of the instruction processors, reference to or registration into the tag register 71 can be restricted according to the second and later characters set in the order field of the command. For example, in the execution of a processing command whose order includes a character "R" which represents the last MS reference, even when data is fetched from the MS in the R21 stage, it is possible to prevent the fetched data from being registered into the data memory 93 and thus to release the assigned entry. A relatively small number of entries of the data memory are utilized efficiently by releasing assigned entries as early as possible and assigning them to other instruction processors. It is also recommended to watch the instruction processor numbers registered in the tag register and control so that at most one entry may be assigned to one instruction processor for even assignment of entries.

Figure 11:
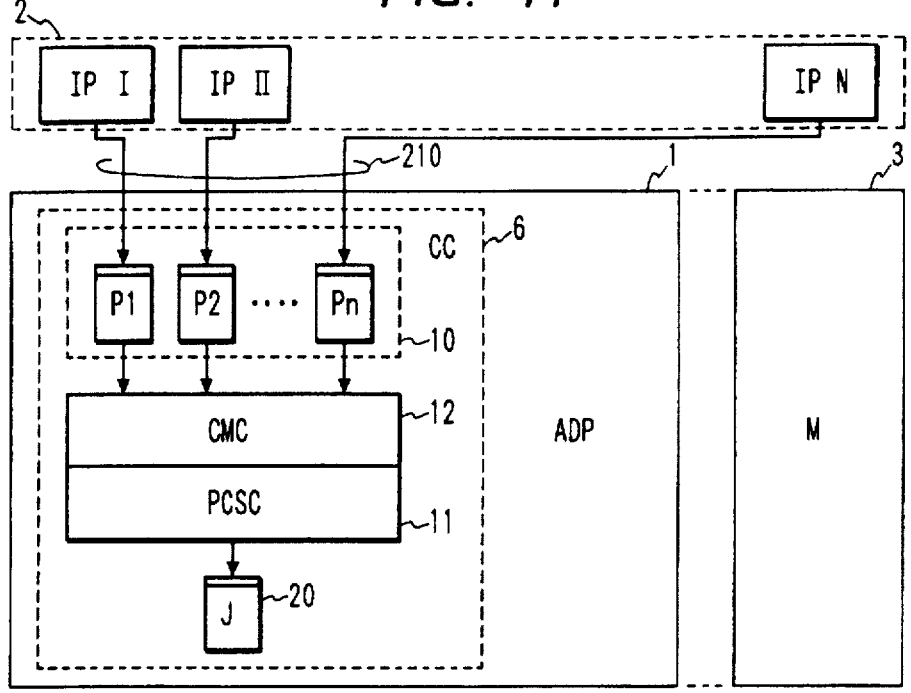
FIG. 11 is a block diagram illustrating a feature of a second embodiment of the present invention.

FIG. 11 shows a second embodiment of the present invention. This embodiment is characterized in that a command mask circuit (CMC) 12 is provided between the P register 10 and the command selection circuit 11 for preferentially processings a processing command sent from an instruction processor that is using the auxiliary data processor 1, thereby making efficient use of a small number of entries of the data memory in the auxiliary data processor 1. Accordingly, this embodiment is suitable for a case in which the entries of the data memory is less than the instruction processors 200 connected to the auxiliary data processor 1. Portions that are not directly related to the command mask circuit 12 are the same as those shown in FIG. 1, and are therefore not shown in the figure.

Figure 12:
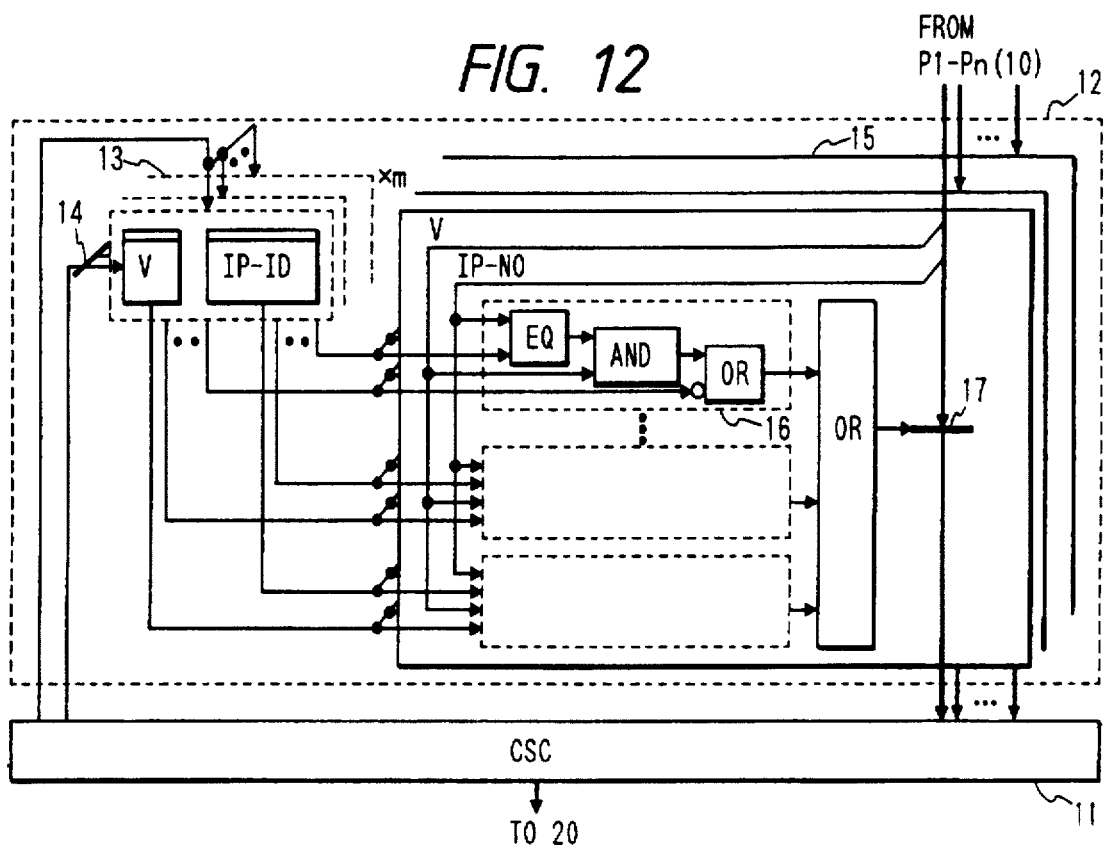
FIG. 12 is a block diagram illustrating the configuration of the command mask circuit shown in FIG. 11.

FIG. 12 shows the details of the command mask circuit 12. The command mask circuit 12 includes a register 13 for retaining the identification numbers of these instruction processors which have been allowed to use the auxiliary data processor 1. More particularly, the register 13 has entries as many as those ("m") of the data memory 93 in the auxiliary data processor 1, and holds therein the identification numbers of those instruction processors which were selected by the command selection circuit 11. The command mask circuit 12 has also submask circuits 15 which are provided in one-to-one correspondence to the instruction processors 200 and are connected to the P1 to Pn registers, respectively.

Each submask circuit 15 includes availability decision circuits 16 which are provided in one-to-one correspondence to the entries of the register 13. Each availability circuit 16 receives a processing command from an instruction processor corresponding to the submask circuit to which this very availability circuit belongs and the content of the corresponding entry of the register 13. Each availability circuit compares an instruction processor number sent from the corresponding instruction processor with an instruction processor number registered in the corresponding entry of the register 13, and turns on a gate 17 when the instruction processor numbers are identical and the processing command is valid or when the corresponding entry of the register 13 has no registered data, thereby passing the processing command to the command selection circuit 11.

In short, these submask circuits 15 compare the identification numbers of the instruction processors which issued processing commands with all instruction processor numbers retained in the register 13, and pass the processing commands to the command selection circuit 11 when the instruction processor numbers agree or when the register 13 has empty entries. Registering of an instruction processor number into the register 13 and deleting of it may be controlled by the order in the processing command. For example, a processing command is registered into in the register 13 when its order includes a character "S," and the registration is deleted when the order in a command includes a character "R." With such control, a sequence of processing commands are executed consecutively.

Figure 13:
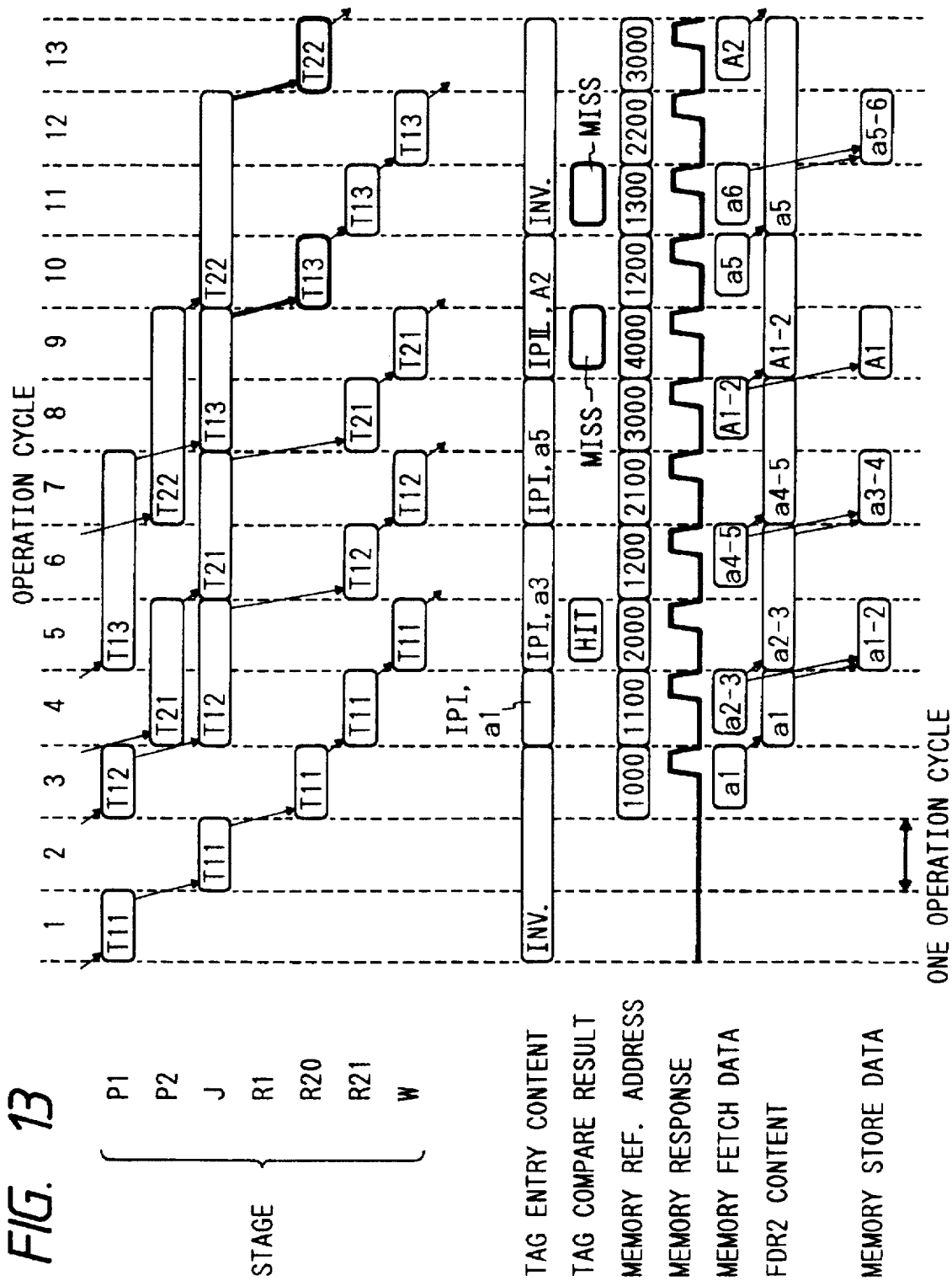
FIG. 13 is a timing diagram for the execution of the move processings in the first embodiment having a single-entry data memory.

FIG. 13 is a timing diagram for the move processing shown in FIG. 5 wherein the data memory 93 in the auxiliary data processor 1 as shown in FIG. 1 has only one entry (m=1). In the auxiliary data processor shown in FIG. 1, the command selection circuit 11 outputs processing commands on a first-come first-served basis. Accordingly, the case shown in FIG. 13, processing commands sent from the instruction processor I and processing commands sent from the instruction processor 2 alternately use the single-entry data memory and replace data retained therein. So the data must be fetched anew from the MS in operation cycles 10 and 13. However, note that no malfunction will occur as the content of the tag register 71 is changed before it is referred to. In the operation cycle 9, for example, the command T13 refers to the tag register, but the content of the tag register has already been changed by the command T21.

Figure 14:
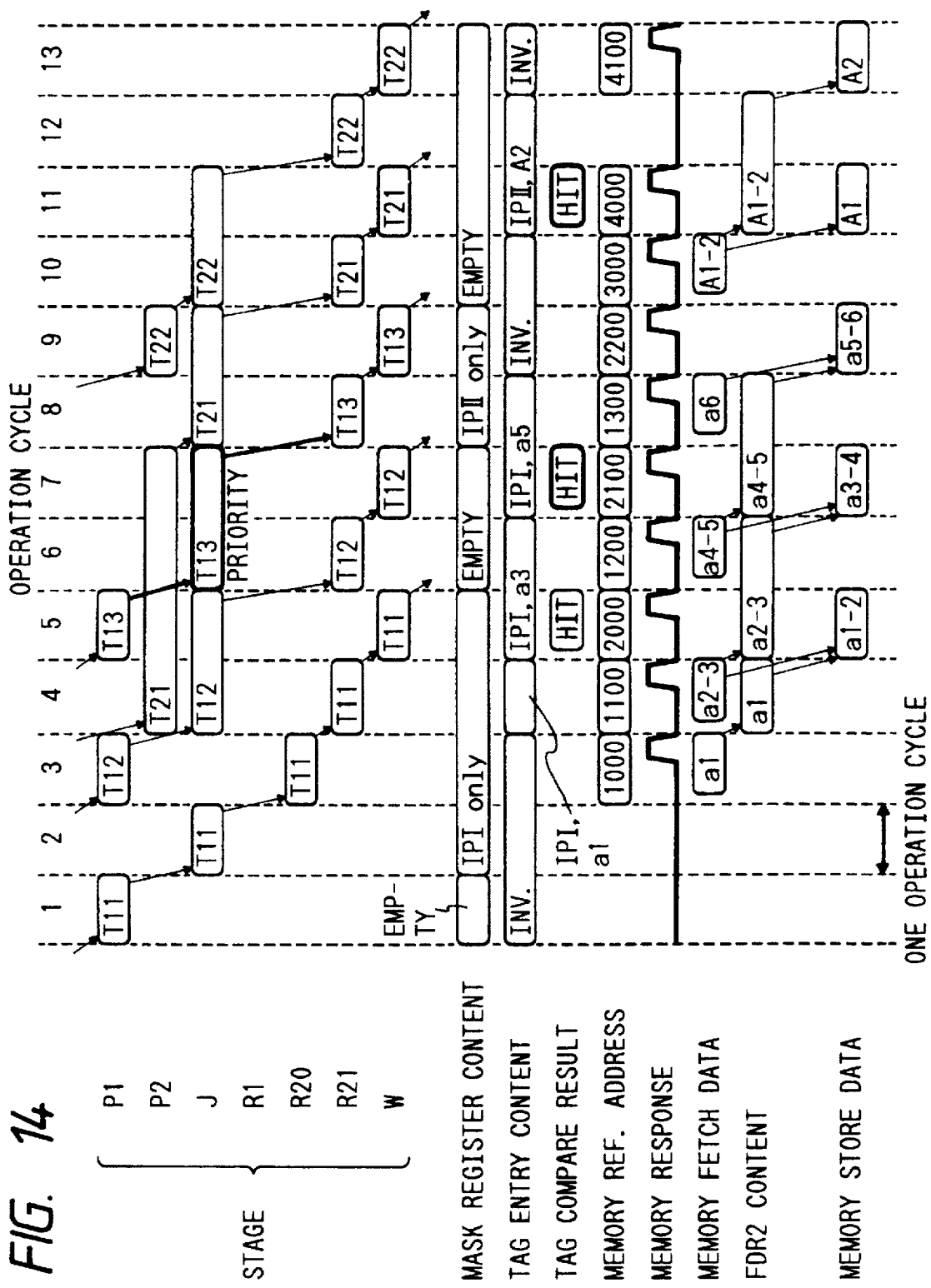
FIG. 14 is a timing diagram for the execution of the move processings in the second embodiment having a single-entry data memory.

In contrast, FIG. 14 is a timing diagram for the move processing shown in FIG. 5 wherein the data memory in the auxiliary data processor 1 as shown in FIG. 11 has only one entry (m=1). In the auxiliary data processor shown in FIG. 11, the command mask circuit 12 preferentially selects a processing command sent from the instruction processor I that have already been accepted. Accordingly, the commands T11, T12, and T13 are processed in succession. As a result, re-fetching of data from the MS is not required and the rate of this processing is higher than that of FIG. 13.

However, the start of execution of the processing commands sent from the instruction processor II is delayed.

Figure 15:
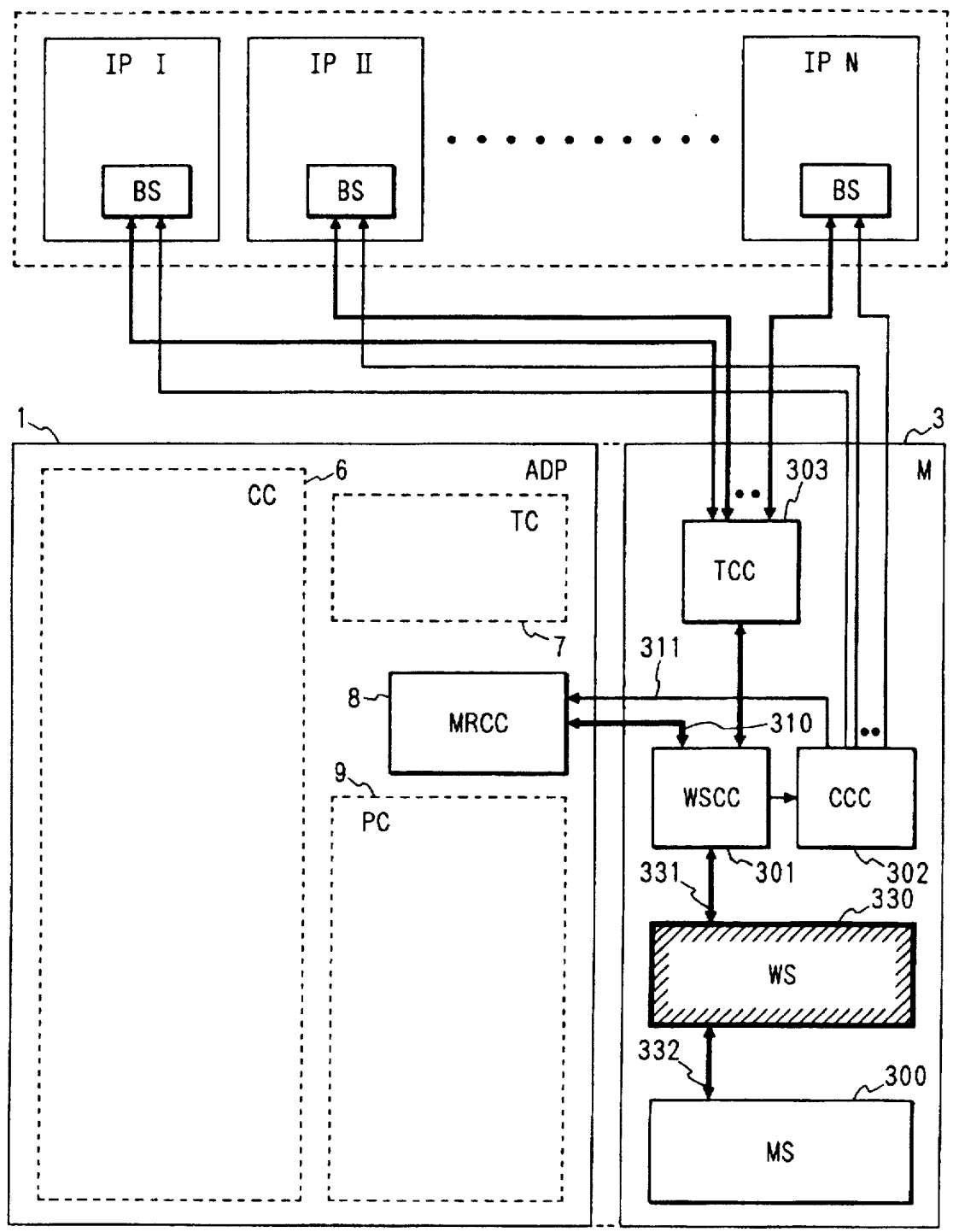
FIG. 15 is a block diagram illustrating a feature of a third embodiment of the present invention.

FIG. 15 shows a third embodiment of this invention. This embodiment is characterized in that the memory 3 includes a work storage (WS) 330 which retains a copy of part of data in the MS 300. In FIG. 15 the details of portions which have no direct relation to the WS are omitted as they are the same as those shown in FIG. 1. The work storage WS can be called a second cache memory provided between the MS and the BS in an instruction processor. The capacity of the WS is larger than that of the BS but smaller than that of the MS, while the speed of the WS is lower than that of the BS but higher than that of the MS. The store operation concerning the MS and the BS may be controlled, for example, in a store-in manner. If the required data is present in the WS, the MS access time is reduced seemingly. With the provision of a WS, the processing rate of the auxiliary data processor in accordance with the present invention increases and consequently the processing rate of the system is further improved. Although the MS access time is reduced seemingly, the operation sequence of the auxiliary data processor 1 remains the same as that of the first embodiment.

When the required data is not present in the WS, it is usual that the data is transferred from the MS to the WS and then fetched from the WS. However, other methods are also available. For example, in the case where data corresponding to just one block is stored from the auxiliary data processor, it is possible to omit fetching from the MS and to store the data only into the secured block in the WS. This is because, in this case, the data of a block fetched from the MS is replaced in its entirety by the data sent from the auxiliary data processor.

Next will be explained methods of preventing a cache pollution further with respect to the WS 330. For example, a second auxiliary data processor connected directly to the MS is provided, in addition to the above-described auxiliary data processor, and the destination of a processing command is switched between those two auxiliary data processors according to the hit/miss status of the WS. This mechanism is believed to be easily understood from the above description, and the detailed explanation thereof is therefore omitted. Below will be explained a mechanism which, when a WS miss occurs, allows or inhibits registration into the WS of data fetched from the MS according to a reference request source, thereby preventing a cache pollution.

Figures 16, 17:
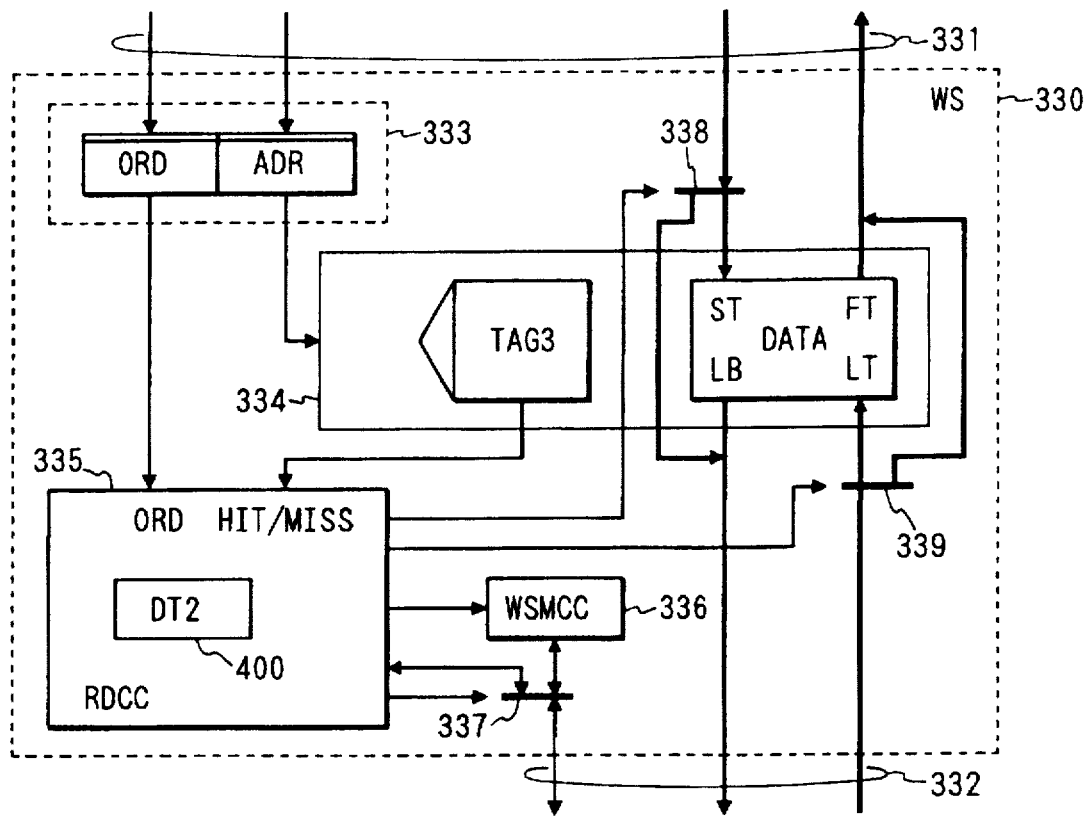
FIG. 16 is a block diagram illustrating improvements in the work storage in FIG. 15.
FIG. 17 is a decision table in the work storage shown in FIG. 16.

FIG. 16 shows a configuration of the work storage 330 provided with the aforementioned cache pollution preventing mechanism. This WS includes a reference request retaining register 333 for retaining a reference (fetch or store) request, a WS cache 334 for retaining WS data, a reference destination determine circuit (RDCC) 335 which determines a destination of a reference request according to the result of cache hit/miss decision, and a WS miss control circuit (WSMCC) 336 for transferring data from the MS 300 and registering it into the WS cache 334 when a WS cache miss occurs. The WS further includes an MS control signal selection circuit 337 for selecting an MS reference control signal, a store data destination selection circuit 338 for switching the destination of store data between the WS cache 334 and the MS 300, and a fetch data destination selection circuit 339 for controlling whether the data fetched from the MS 300 is stored into the WS cache 334 or bypasses the WS cache. The unit of data stored in the WS cache 334 is, like the BS 203, 256 bytes.

FIG. 17 shows an example of a decision table 400 provided within the reference destination determine circuit 335. The decision table 400 controls data registration into the WS cache 334 and a data transfer path according to the type of a reference request and the hit/miss status of the WS cache. The WS 330 in this embodiment is of the store-in type. Four types of reference requests are prepared for identifying reference request sources and reference types. A normal fetch request and a normal store request are issued by the BS 202 in the instruction processor 200. A direct fetch request and a direct store request are issued by the auxiliary data processor 1. In the DATA FLOW column of FIG. 17, a portion enclosed in parentheses indicates an additional operation which is executed initially. For example, when a WS miss occurs in the processing of a normal fetch request, the required data is transferred from the MS to the WS and registered thereinto, then sent to a reference request source.

When a WS miss occurs in the processing of a normal fetch request or a normal store request sent from an instruction processor, data at a specified address is fetched from the MS 300 and registered into the WS cache 334, then the requested operation is executed. Since the WS is of the store-in type, it sometimes happens that the data having been stored into the WS cache is stored back into the WS when the data fetched from the MS is registered into the WS cache. These operations are controlled by the WS miss control circuit 336.

When a direct fetch request or a direct store request sent from the auxiliary data processor is executed, reference request destination is switched according to the WS hit/miss status. Processing at the occurrence of a WS hit is the same as the processing of a normal fetch or store request. When a WS miss occurs in the processing of a direct fetch request, a data transfer request is sent to the MS, and the data sent from the MS is transferred to a reference request source without being stored into the WS cache, bypassing the WS cash. The MS control signal selection circuit 337 is provided to Rend a data transfer request to the MS without actuating the WS miss control circuit 336. Further, the fetch data destination selection circuit 339 is provided to cause the data sent from the MS to bypass the WS cache. When a WS miss occurs in the processing of a direct store request, the store data is stored into the MS without being stored into the WS cache, bypassing the WS cache. The data store destination circuit 338 is provided to cause the store data to bypass the WS cache. These selection circuits are controlled by the reference destination determine circuit 335. In this way, the registration into the WS of data fetched from the MS when a WS miss occurs is allowed or inhibited according to a reference request source thereby preventing a cache pollution.

The above-described technique to control the registration of data into the WS is also applicable to the BS. More particularly, it is possible to prevent the BS or WS from being polluted by providing in the instruction processor a circuit which issues a direct fetch request and a direct store request, thereby bypassing the BS and directly referring to the WS or MS when a BS miss occurs.

Figure 18:
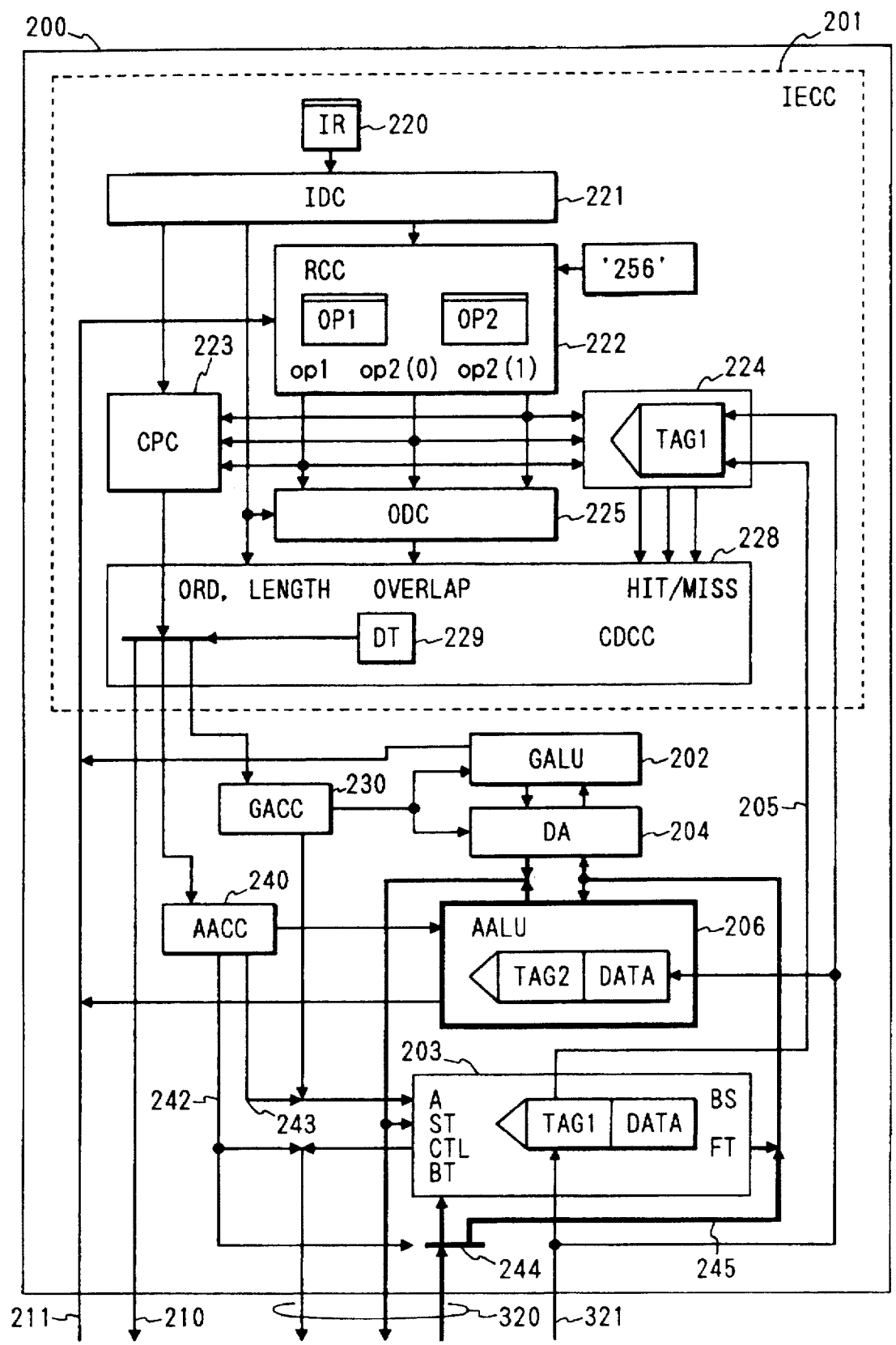
FIG. 18 is a block diagram of another example of the internal configuration of the instruction processor.

FIG. 18 is an example of the configuration of the instruction processor which has been modified as explained above. The same reference numerals as those appearing in FIG. 2 represent the equivalent components. In addition to the components shown in FIG. 2, there are provided an auxiliary ALU (AALU) 206, an auxiliary ALU control circuit (AACC) 240, a data destination selection circuit 244, and a BS bypass data line 245. Although the MS has data stored and fetched one block consisting of 256 bytes at a time, the general-purpose ALU 202 does not have a data memory of 256 bytes wide. As a result, the general-purpose ALU cannot directly carry out processing which requires two pieces of MS data, such as compare processing, and processing of data which extends over two blocks. To improve this, the auxiliary ALU 206 having a data memory of 256 bytes wide is provided. The auxiliary ALU 206 and the auxiliary ALU control circuit 240 as a whole have a structure similar to that of the auxiliary data processor 1 shown in FIG. 1, and carry out move processing and arithmetic and logic processing at a higher rate than the general-purpose ALU does. Further, since memory coherency control is performed on data which is retained internally, there is no fear of erroneously processing unupdated data even when a plurality of instruction processors are operating in parallel. However, as data is transferred 16 bytes at a time between the instruction processor 200 and the memory 3, the auxiliary ALU 206 has a circuit which assembles data arriving 16 bytes by 16 bytes into a 256-byte data block, and sends the data block 16 bytes by 16 bytes.

The auxiliary ALU control circuit 240 sends a reference request (243) to the BS 203 when a BS hit occurs, or sends a direct fetch or store request (242) to the memory 3 when a BS miss occurs. In order to implement the above reference request destination switching, the auxiliary ALU control circuit 240 includes circuits similar to the reference request destination determine circuit 335 and the MS control signal selection circuit 337 shown in FIG. 16. The type of reference (fetch or store) is determined according to the order in each processing command. Furthermore, as explained with reference to FIG. 3, each operand information in a command includes BS hit/miss information. Accordingly, the reference request destinations are switched according to these information. The data destination selection circuit 244 causes the data sent from the memory 3 to bypass the BS 203 when the auxiliary ALU control circuit 240 issues a direct fetch request. As the BS 203 is of the store-through type, the store data destination selection circuit is not required.

The command destination selection circuit 228 selects one of the auxiliary data processor 1, the general-purpose ALU control circuit 230, and the auxiliary ALU control circuit 240 as the destination of a processing command. Accordingly, the content of the decision table 229 is somewhat different from the content of the decision table 227 shown in FIG. 2 and FIG. 15. FIG. 19 shows an example of the decision table 229 shown in FIG. 18. The decision table 229 is different from the decision table 227 in that comparison of the operand length with a predetermined value is omitted as a cache pollution is suppressed, and that, when the first operand to be updated indicates a BS hit, the auxiliary ALU is selected regardless of the hit/miss status of the second operand in order to avoid a retransfer of a block, which would result from invalidation. When the first operand indicates a BS hit and also the second operand indicates a BS miss, it may occur that the second operand is transferred twice (for the first and second halves) from the MS. However, no cache pollution occurs since registration into the BS is omitted. When the first operand is not to be updated or indicates a BS miss, the processing command can be processed at a high rate without causing a cache pollution by using the auxiliary data processor 1.

FIG. 20 is a table of data transfer control types to be selected according to combinations of reference requests and hit/miss status of the BS and the WS in a computer system having a work storage (WS) with a cache pollution prevention mechanism illustrated in FIG. 16 and an instruction processor with an auxiliary ALU illustrated in FIG. 18. In the case of a normal fetch request, BS hit/miss and WS hit/miss are judged in that order. When a BS and/or WS hit occurs, data is fetched from hitting cache memory. When a hit does not occur, data is sequentially transferred from a hierarchically lower memory (MS or WS) to a higher memory (WS or BS) and registered, then fetched. In the case of a normal store request, data is stored into the BS only when it hits because the BS is of the store-through type, while data is stored into the WS regardless of the BS hit/miss status. As the WS is of the store-in type, when a WS miss occurs, data at a specified address is fetched from the MS and registered into the WS, then WS store takes place. In the case of a direct fetch request, BS hit/miss and WS hit/miss are judged in that order. When a BS and/or WS hit occurs, data is fetched from the hitting cache memory. When a hit does not occur, data is sequentially transferred from a hierarchically lower memory to a higher memory, but not registered into the BS nor the WS. In the case of a direct store request, data is stored into the BS only when it hits while data is stored into the WS when it hits, but data is stored directly into the MS when a WS miss occurs.

In this way, cache pollution can be prevented more effectively by switching the destinations of processing commands and the manner of data transfer control.

In a computer system provided with auxiliary data processor in accordance with the present invention, the number of instruction processors is arbitrary, including only one.

Further, in a computer system provided with an auxiliary data processor in accordance with the present invention, the wider the data line through which data to be processed by the auxiliary data processor flows is, the higher the processing rate is. In the above embodiments, that data line should be 256 bytes wide as data of 256 bytes is fetched at a time from the MS.

What is claimed is:

1. A computer comprising:
   a main memory;
   a cache memory connected to said main memory for holding a duplicate of part of data stored in said main memory;
   a first arithmetic and logic unit connected to said cache memory for processing data by referring to said cache memory;
   a second arithmetic and logic unit, connected directly to said main memory but not to said cache memory, for processing data by referring directly to said said memory without copying data into said cache memory;
   a means for determining condition of at least one operand that is designated by an instruction and is identified by an address in said main memory; and
   a means connected to said determining means and to said first and second arithmetic and logic unit for selectively actuating said first or second arithmetic and logic unit, in dependence on whether said operand is in a predetermined condition or not, for execution of said instruction.

2. A computer as claimed in claim 1, wherein said condition includes whether length of said operand is smaller than a predetermined value.

3. A computer as claimed in claim 1, wherein said condition includes whether an operand to be updated is present.

4. A computer as claimed in claim 1, wherein said condition includes whether said operand is present in said cache memory.

5. A computer as claimed in claim 1, wherein said condition includes whether an operand to be fetched overlaps an operand to be stored.

6. A computer as claimed in claim 1, wherein said condition includes whether length of said operand is smaller than a predetermined value, whether an operand to be updated is present, whether said operand is present in said cache memory, and whether an operand to be fetched overlaps an operand to be stored, and said predetermined condition specifies a combination of those conditions.

7. A computer as claimed in claim 1, wherein data width of said second arithmetic and logic unit is larger than that of said first arithmetic and logic unit.

8. A computer comprising:

a main memory;

a cache memory connected to said main memory for holding a duplicate of part of data stored in said main memory;

a first arithmetic and logic unit connected to said cache memory for processing data by referring to said cache memory;

a second arithmetic and logic unit connected to said cache memory and to said main memory, by a path which bypasses said cache memory, for processing data by referring to said cache memory when a hit occurs in said cache memory, or by referring directly to said main memory, without copying data into said cache memory, when a miss occurs in said cache memory;

a means for determining condition of at least one operand that is designated by an instruction and is identified by an address in said main memory; and a means connected to said determining means and to said first and second arithmetic and logic unit for selectively actuating said first or second arithmetic and logic unit, in dependence on whether said operand is in a predetermined condition or not, for execution of said instruction.

9. A computer as claimed in claim 8, wherein said condition includes whether an operand to be fetched overlaps an operand to be stored.

10. A computer as claimed in claim 8, wherein data width of said second arithmetic and logic unit is larger than that of said first arithmetic and logic unit.

11. A computer comprising:

a main memory;

a cache memory connected to said main memory for holding a duplicate of part of data stored in said main memory;

a first arithmetic and logic unit connected to said cache memory for processing data by referring to said cache memory;

a second arithmetic and logic unit, connected directly to said main memory but not to said cache memory, for processing data by referring directly to said main memory without copying data into said cache memory;

a third arithmetic and logic unit connected to said cache memory and to said main memory, by a path which bypasses said cache memory, for processing data by referring to said cache memory when a hit occurs in said cache memory, or by referring directly to said main memory, without copying data into said cache memory, when a miss occurs in said cache memory;

a means for determining condition of at least one operand that is designated by an instruction and is identified by an address in said main memory; and a means connected to said determining means and to said first, second and third arithmetic and logic unit for selectively actuating said first, second or third arithmetic and logic unit, in dependence on whether said operand is in a first, second or third predetermined condition, for execution of said instruction.

12. A computer as claimed in claim 11, wherein said condition includes whether length of said operand is smaller than a predetermined value, whether an operand to be updated is present, whether said operand is present in said cache memory, and whether an operand to be fetched overlaps an operand to be stored, and said first, second and third predetermined condition specify different combinations of those conditions.

13. A computer as claimed in claim 11, wherein data widths of said second and third arithmetic and logic unit are larger than that of said first arithmetic and logic unit.

* * * * *